United States Patent
Heinecke et al.

(10) Patent No.: US 12,229,554 B2
(45) Date of Patent: Feb. 18, 2025

(54) BFLOAT16 FUSED MULTIPLY INSTRUCTIONS

(71) Applicant: Intel Corporation, Santa Clara, CA (US)

(72) Inventors: Alexander Heinecke, San Jose, CA (US); Menachem Adelman, Haifa (IL); Robert Valentine, Kiryat Tivon (IL); Zeev Sperber, Zikhron Yaakov (IL); Amit Gradstein, Binyamina (IL); Mark Charney, Lexington, MA (US); Evangelos Georganas, San Mateo, CA (US); Dhiraj Kalamkar, Bangalore (IN); Christopher Hughes, Santa Clara, CA (US); Cristina Anderson, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 597 days.

(21) Appl. No.: 17/463,405

(22) Filed: Aug. 31, 2021

(65) Prior Publication Data
US 2023/0067810 A1 Mar. 2, 2023

(51) Int. Cl.
*G06F 9/30* (2018.01)
*G06F 7/544* (2006.01)

(52) U.S. Cl.
CPC ........ *G06F 9/30014* (2013.01); *G06F 7/5443* (2013.01); *G06F 9/30036* (2013.01); *G06F 9/30038* (2023.08); *G06F 9/30145* (2013.01)

(58) Field of Classification Search
CPC ............. G06F 9/30014; G06F 9/30038; G06F 9/30036; G06F 9/30145; G06F 7/5443
See application file for complete search history.

(56) References Cited

U.S. PATENT DOCUMENTS 4,815,021 A    3/1989   Steiner et al.
11,182,337 B1 * 11/2021 Maiyuran ........... G06F 15/8046
(Continued)

FOREIGN PATENT DOCUMENTS

CN    112199119 A        1/2021
EP       3796154 A1 *    3/2021    ............. G06F 7/483
(Continued)

OTHER PUBLICATIONS

Office Action, EP App. No. 22185939.0, Aug. 22, 2023, 05 pages.
Office Action, EP App. No. 22185990.3, Aug. 22, 2023, 05 pages.
Wikipedia, "bfloat16 floating-point format", available online at <https://en.wikipedia.org/w/index.php?title=Bfloat16_floating-point_format&oldid=1033549871>, Jul. 14, 2021, 4 pages.
(Continued)

*Primary Examiner* — Cheng Yuan Tseng
(74) *Attorney, Agent, or Firm* — NICHOLSON DE VOS WEBSTER & ELLIOTT LLP

(57) ABSTRACT

Techniques for performing BF16 FMA in response to an instruction are described. In some examples, an instruction has fields for an opcode, an identification of location of a packed data source/destination operand (a first source), an identification of a location of a second packed data source operand, an identification of a location of a third packed data source operand, and an identification of location of a packed data source/destination operand, wherein the opcode is to indicate operand ordering and that execution circuitry is to, per data element position, perform a BF16 value fused multiply-accumulate operation using the first, second, and third source operands and store a result in a corresponding data element position of the source/destination operand.

30 Claims, 19 Drawing Sheets

```
VF[N]M[ADD,SUB] [132, 213, 231]NEPBF16 (third prefix encoded versions) when src3 operand is a memory source
(KL, VL) = (8, 128), (16, 256), (32, 512)

IF      *132 form*:
          a  := SRC1/DEST
          b  := SRC3
          c  := SRSC2
ELIF    *213 form*:
          a  := SRC2
          b  := SRC1/DEST
          c  := SRC3
ELIF *231 form*:
          a  := SCR2
          b  := SRC3
          c  := SRC1/DEST IF      *negative form*:
          a  := -a IF      *add form*:
          OP  := +
ELIF    *sub form*:
          OP  := -

FOR     j  := 0 TO KL-1:
        IF  k1[j] OR *no writemask*:
            IF EVEX.b == 1:
                DEST.bf16[j] := RoundFPControl_RNE(a.bf16[j]*b.bf16[j]) OP c.bf16[0])   //DAZ, FTZ, SAE
            ELSE:
                DEST.bf16[j] :=RoundFPControl_RNE(a.bf16[j]*b.bf16[j]) OP c.bf16[j])   //DAZ, FTZ, SAE
        ELSE IF *zeroing*:
            DEST.bf16[j] := 0
        // else dest.bf16[j] remains unchanged
DEST[MAX_VL-1 :VL]   := 0
```

(56) References Cited

U.S. PATENT DOCUMENTS

| | | | |
|---|---|---|---|
| 11,204,977 B2* | 12/2021 | Maiyuran | G06F 15/8046 |
| 11,714,998 B2* | 8/2023 | Abuhatzera | G06F 7/5443 |
| | | | 706/25 |
| 2003/0018676 A1 | 1/2003 | Shaw | |
| 2011/0047358 A1 | 2/2011 | Eichenberger et al. | |
| 2014/0067894 A1 | 3/2014 | Plondke et al. | |
| 2015/0088946 A1 | 3/2015 | Anderson et al. | |
| 2016/0224512 A1 | 8/2016 | Moudgill et al. | |
| 2019/0079768 A1* | 3/2019 | Heinecke | G06F 9/30025 |
| 2019/0303743 A1* | 10/2019 | Venkataramani | G06N 3/063 |
| 2019/0384575 A1 | 12/2019 | Hickmann et al. | |
| 2020/0184309 A1 | 6/2020 | Patel | |
| 2020/0371794 A1 | 11/2020 | Zbiciak et al. | |
| 2020/0371805 A1 | 11/2020 | Lutz | |
| 2021/0049463 A1* | 2/2021 | Ruff | G06F 9/30038 |
| 2021/0117194 A1* | 4/2021 | Heinecke | G06F 9/3887 |
| 2021/0157589 A1 | 5/2021 | Heinecke et al. | |
| 2022/0107805 A1* | 4/2022 | Gore | G06F 7/483 |
| 2022/0121727 A1 | 4/2022 | Hong et al. | |
| 2022/0365751 A1* | 11/2022 | Varma | G06F 7/5318 |

FOREIGN PATENT DOCUMENTS

| | | | |
|---|---|---|---|
| GB | 2186105 A | 8/1987 | |
| WO | 2008/036946 A1 | 3/2008 | |
| WO | 2020/190814 A1 | 9/2020 | |

OTHER PUBLICATIONS

Decision to grant, EP App. No. 22183762.8, Feb. 15, 2024, 2 pages.
Intention to grant, EP App. No. 22183762.8, Oct. 11, 2023, 7 pages.
Intel, "Intel® Architecture Instruction Set Extensions and Future Features Programming Reference", Reference No. 319433-032, Jan. 2018, 137 pages.
Notification of Oral Proceeding, EP App. No. 22185990.3, Mar. 22, 2024, 9 pages.
European Search Report and Search Opinion, EP App. No. 22188067.7, Jan. 25, 2023, 12 pages.
European Search Report and Search Opinion, EP App. No. 22188069.3, Jan. 25, 2023, 10 pages.
European Search Report and Search Opinion, EP App. No. 22188079.2, Jan. 25, 2023, 10 pages.
Notification of Publication of Patent Application for Invention, CN App. No. 202210866252.7, Mar. 8, 2023, 3 pages (1 page of English Translation and 2 pages of Original Document).
European Search Report and Search Opinion, EP App. No. 22185939.0, Jan. 20, 2023, 9 pages.
European Search Report and Search Opinion, EP App. No. 22185990.3, Jan. 20, 2023, 10 pages.
Extended European Search Report and Search Opinion for Application No. 22183762.8, Dec. 21, 2022, 9 pages.
Intel, "Intel (registered) 64 and IA-32 Architectures Software Developer's Manual", vol. 2 (2A, 2B & 2C): Instruction Set Reference, A-Z, Order No. 325383-055US, Jun. 2015, 1011 pages.
Intel, "Intel® Architecture Instruction Set Extensions Programming Reference", Order No. 319433-023, Aug. 1, 2015, 1178 pages.

* cited by examiner

FETCH AN INSTRUCTION HAVING FIELDS FOR AN OPCODE, AN IDENTIFICATION OF LOCATION OF A PACKED DATA SOURCE/DESTINATION OPERAND (FIRST SOURCE), AN IDENTIFICATION OF A LOCATION OF A SECOND PACKED DATA SOURCE OPERAND, AN IDENTIFICATION OF A LOCATION OF A THIRD PACKED DATA SOURCE OPERAND, AND AN IDENTIFICATION OF LOCATION OF A PACKED DATA SOURCE/DESTINATION OPERAND, WHEREIN THE OPCODE IS TO INDICATE OPERAND ORDERING AND THAT EXECUTION CIRCUITRY IS TO, PER DATA ELEMENT POSITION, PERFORM A BF16 FUSED MULTIPLY-ACCUMULATE OPERATION USING THE FIRST, SECOND, AND THIRD SOURCE OPERANDS AND STORE A RESULT IN A CORRESPONDING DATA ELEMENT POSITION OF THE SOURCE/DESTINATION OPERAND 401

TRANSLATE THE FETCHED INSTRUCTION INTO ONE OR MORE INSTRUCTIONS 403

DECODE THE INSTRUCTION (OR THE TRANSLATED ONE OR MORE INSTRUCTIONS) 405

RETRIEVE DATA ASSOCIATED WITH THE SOURCE OPERAND(S) AND SCHEDULE 407

EXECUTE THE DECODED INSTRUCTION(S) TO, PER DATA ELEMENT POSITION, PERFORM A BF16 FUSED MULTIPLY-ACCUMULATE OPERATION USING THE FIRST, SECOND, AND THIRD SOURCE OPERANDS AND STORE A RESULT IN A CORRESPONDING DATA ELEMENT POSITION OF THE SOURCE/DESTINATION OPERAND 409

COMMIT A RESULT OF THE EXECUTED INSTRUCTION(S) 411

FIG. 4

VF[,N]M[ADD,SUB] [132, 213, 231]NEPBF16 (third prefix encoded versions) when src3 operand is a memory source
(KL, VL) = (8, 128), (16, 256), (32, 512)

```
IF       *132 form*:
            a   := SRC1/DEST
            b   := SRC3
            c   := SRSC2
ELIF     *213 form*:
            a   := SRC2
            b   := SRC1/DEST
            c   := SRC3
ELIF *231 form*:
            a   := SCR2
            b   := SRC3
            c   := SRC1/DEST IF       *negative form*:
            a   := -a IF       *add form*:
            OP    := +
ELIF     *sub form*:
            OP    := -

FOR      j    := 0 TO KL-1:
            IF  k1 [j] OR *no writemask*:
                   IF EVEX.b == 1:
                        DEST.bf16[j]  := RoundFPControl_RNE(a.bf16[j]*b.bf16[j] OP c.bf16[0])   //DAZ, FTZ, SAE
                   ELSE:
                        DEST.bf16[j]  :=RoundFPControl_RNE(a.bf16[j]*b.bf16[j] OP c.bf16[j])    //DAZ, FTZ, SAE
            ELSE IF *zeroing*:
               DEST.bf16[j] := 0
            //  else dest.bf16[j] remains unchanged
DEST[MAX_VL-1 :VL]    := 0
```

FIG. 5

```
VF [,N]M[ADD,SUB] [132, 213, 231]NEPBF16 (third prefix encoded versions) when src3 operand is a register
(KL, VL) = (8, 128), (16, 256), (32, 512)

IF        *132 form*:
             a   := SRC1/DEST
             b   := SRC3
             c   := SRSC2
ELIF      *213 form*:
             a   := SRC2
             b   := SRC1/DEST
             c   := SRC3
ELIF *231 form*:
             a   := SCR2
             b   := SRC3
             c   := SRC1/DEST IF        *negative form*:
             a   := -a IF        *add form*:
             OP    := +
ELIF      *sub form*:
             OP    := -

FOR       j   := 0 TO KL-1:
             IF  k1 [j] OR *no writemask*:
                 IF EVEX.b == 1:
                     DEST.bf16[j]  := RoundFPControl_RNE(a.bf16[j]*b.bf16[j] OP c.bf16[0])    //DAZ, FTZ, SAE
                 ELSE:
                     DEST.bf16[j]  := RoundFPControl_RNE(a.bf16[j]*b.bf16[j] OP c.bf16[j])    //DAZ, FTZ, SAE
             ELSE IF *zeroing*:
                 DEST.bf16[j]  := 0
             //  else dest.bf16[j] remains unchanged
DEST[MAX_VL-1 :VL]    := 0
```

FIG. 6

BFLOAT16 FUSED MULTIPLY INSTRUCTIONS

BACKGROUND

In recent years fused-multiply-add (FMA) units with lower-precision multiplications and higher-precision accumulation have proven useful in machine learning/artificial intelligence applications, most notably in training deep neural networks due to their extreme computational intensity. Compared to classical IEEE-754 32-bit (FP32) and 64-bit (FP64) arithmetic, this reduced precision arithmetic can naturally be sped up disproportional to their shortened width.

BRIEF DESCRIPTION OF DRAWINGS

Various embodiments in accordance with the present disclosure will be described with reference to the drawings, in which:

FIG. 4 illustrates an embodiment of method performed by a processor to process a BF16 FMA instruction.

FIG. 5 illustrates exemplary embodiments of pseudo code representing the execution and format of BF16 FMA instruction.

FIG. 6 illustrates exemplary embodiments of pseudo code representing the execution and format of BF16 FMA instruction.

DETAILED DESCRIPTION

The present disclosure relates to methods, apparatus, systems, and non-transitory computer-readable storage media for performing a fused multiply-add or fused multiply-subtract (fused multiply accumulate or FMA) of BFloat16 (BF16) data elements instruction.

Figure 1:
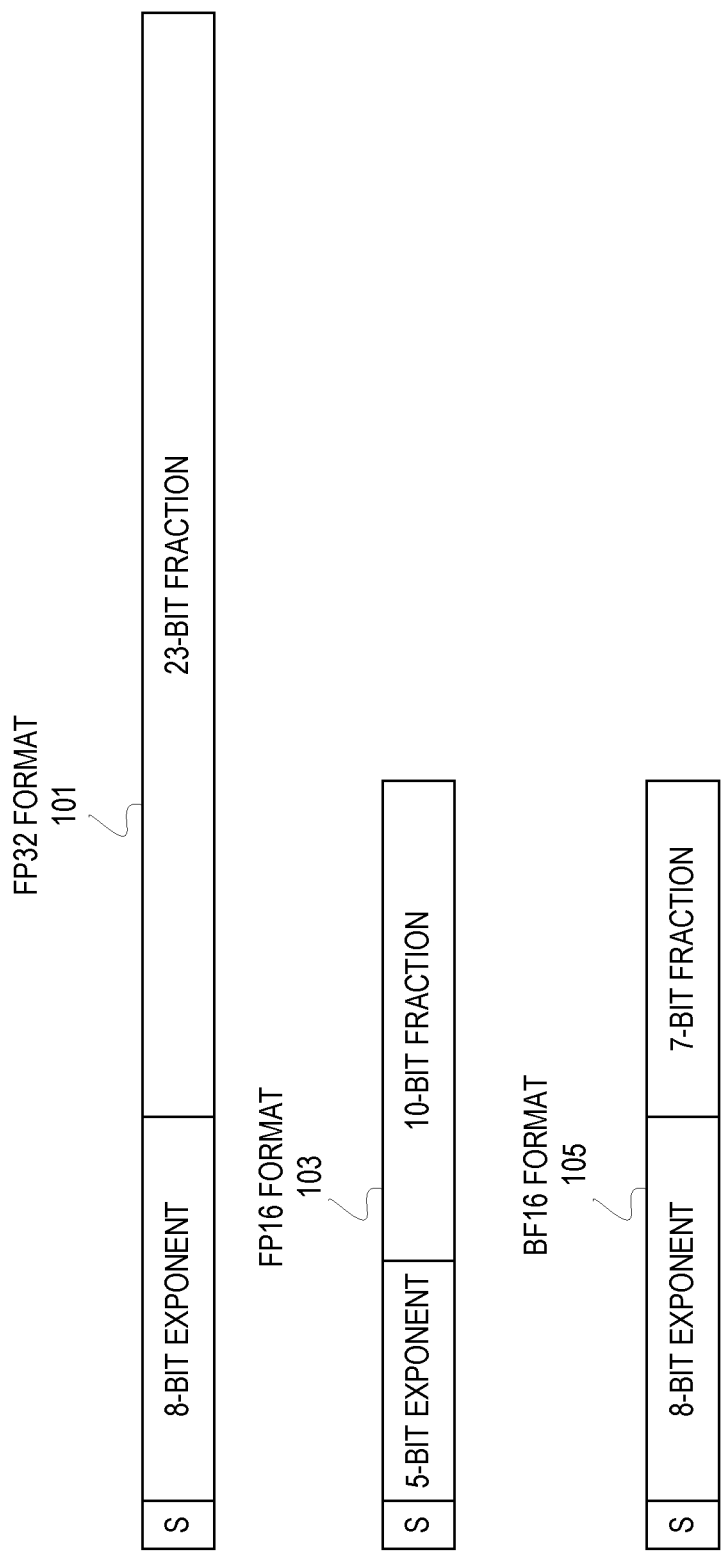
FIG. 1 illustrates different floating point representation formats.

BF16 is gaining traction due to its ability to work well in machine learning algorithms, in particular deep learning training. FIG. 1 illustrates different floating point representation formats. In this illustration, the formats are in little endian format, however, in some embodiments, a big endian format is used. The FP32 format 101 has a sign bit (S), an 8-bit exponent, and a 23-bit fraction (a 24-bit mantissa that uses an implicit bit). The FP16 format 103 has a sign bit (S), a 5-bit exponent, and a 10-bit fraction. The BF16 format 105 has a sign bit (S), an 8-bit exponent, and a 7-bit fraction.

In contrast to the IEEE 754-standardized 16-bit (FP16) variant, BF16 does not compromise on range when being compared to FP32. FP32 numbers have 8 bits of exponent and 24 bits of mantissa (including the one implicit). BF16 cuts 16 bits from the 24-bit FP32 mantissa to create a 16-bit floating point datatype. In contrast FP16, roughly halves the FP32 mantissa to 10 explicit bits and reduces the exponent to 5 bits to fit the 16-bit datatype envelope.

Although BF16 offers less precision than FP16, it is typically better suited to support deep learning tasks. FP16's range is not enough to accomplish deep learning training out-of-the-box due to its limited range. BF16 does not suffer from this issue and the limited precision may actually help to generalize the learned weights in the neural net training task. In other words, lower precision can be seen as offering a built-in regularization property.

Detailed herein are embodiments of instructions, and their support, that operate on BF16 source data elements. In some embodiments, an execution of a single instruction performs an FMA. In some embodiments, the single instruction is translated from a first instruction set architecture (ISA) to one or more instructions of a second ISA and the execution of the one or more instructions of the second ISA perform those calculations.

In some embodiments, one or both of the instruction are defined such as their execution is to treat denormal inputs or outputs as zeros, support any rounding mode, and/or report or suppress floating point numerical flags.

Figure 2:
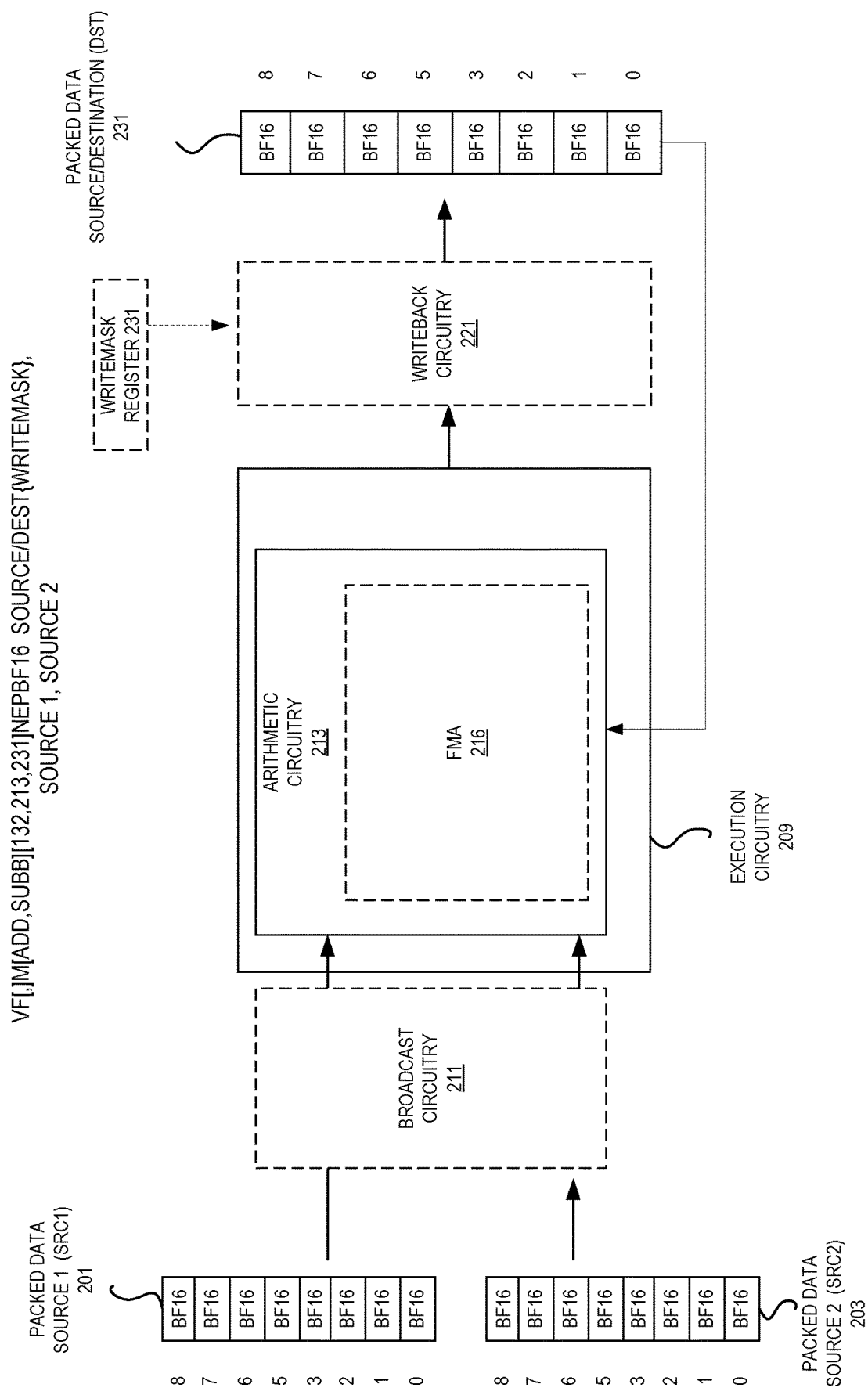
FIG. 2 illustrates an exemplary execution of an instruction to perform fused multiply add or fused multiply subtract operations on BF16 data elements.

FIG. 2 illustrates an exemplary execution of an instruction to perform fused multiply add or fused multiply subtract operations on BF16 data elements. While this illustration is in little endian format, the principles discussed herein work in big endian format. The FMA of BF16 data elements instruction (shown here with an exemplary opcode mnemonic of VF[,N]M[ADD,SUB][132,213,231]NEPBF16) includes one or more fields to define the opcode for the instruction, one or more fields to reference or indicate a packed data source (e.g., a register or memory location), and/or one or more fields to reference or indicate a packed data destination (e.g., a register or memory location). In some embodiments, the instruction also includes one or more fields to reference or indicate a writemask or predication register that is to store writemask or predicate values as described later.

An embodiment of a format for a BF16 FMA instruction is VF[,N]M[ADD,SUB][132,213,231]NEPBF16 SRC1/

DST{k}, SRC2, SRC3. In some embodiments, VF[,N]M [ADD,SUB][132,213,231]NEPBF16 is a generic opcode mnemonic of instruction fused multiply add or fused multiply subtract. The [,N] indicates when a sign flip is to occur (see below for more details). ADD indicates a fused multiply-addition and SUB indicates a fused multiply-subtraction.

As such, this generic opcode mnemonic encompasses a plurality of potential opcodes such as: VFMADD132NEPBF16, VFMADD213NEPBF16, VFMADD231NEPBF16, VFMSUB132NEPBF16, VFMSUB213NEPBF16, VFMSUB231NEPBF16, VFNMADD132NEPBF16, VFNMADD213NEPBF16, VFNMADD231NEPBF16, VFNMSUB132NEPBF16, VFNMSUB213NEPBF16, or VFNMSUB231NEPBF16.

SRC1/DST is a field for the packed data source and destination register operand. SRC2 is one or more fields for the second source such as packed data register and/or memory. SRC3 is one or more fields for the third source such as packed data register and/or memory. The source operands and source/destination operand may come in one or more sizes such as 128-bit, 256-bit, 512-bit, etc. The {k} is used when writemasking or predication is used.

this case either the numbers of bytes at the specified address corresponding to the length of the chosen vector register size are loaded from memory or a scalar value at the specified address is loaded from memory and broadcasted to all entries of the vector register. Both variants load a temporal vector register and then the operation proceeds as if operating on 3 vector registers.

The mnemonic also includes a three-digit value (132, 213, or 231) that represents the ordering of the three source operands. A "1" refers to the first source operand (also the destination operand) in the syntactical order listed in this specification. A "2" refers to the second source operand in the syntactical order. In some embodiments, this is encoded in the instruction's prefix. A "3" refers to the third source operand in the syntactical order. In some embodiments, the first and third operand are encoded following ModR/M encoding rules.

The ordering of each digit within the mnemonic refers to the BF16 data listed on the right-hand side of the arithmetic equation of each FMA operation. The first position in the three digits of a FMA mnemonic refers to the operand position of the first BF16 data expressed in the arithmetic equation of FMA operation, the multiplicand. The second position in the three digits of a FMA mnemonic refers to the operand position of the second BF16 data expressed in the arithmetic equation of FMA operation, the multiplier. The third position in the three digits of a FMA mnemonic refers to the operand position of the BF16 data being added/subtracted to the multiplication result.

A FMA operation has mathematically 4 operands, but some embodiments only allow for 3 operands to be specified. Therefore, one operand needs to be overwritten as detailed below as source/destination.

In some embodiments, one or more of the instruction variants take place under the use of a writemask to the destination register to allow partial operation on the vector register using predication logic.

In some embodiments, the instructions treat all denormal inputs as zero, flush all denormal outputs to zero and round according to the round to nearest tie even mode and suppress all floating point exceptions, the instructions may be defined in future to be flexible including denormal support, various rounding modes and reporting floating point numerical flags.

In this example, the first packed data source 201, the second packed data source 203, and the packed data source/destination 231 each include 8 packed data elements in BF16 format. In some embodiments, the second packed data source 203 may be a register or a memory location. In some embodiments, when the second source 103 is a memory location, the numbers of bytes at the specified address corresponding to the length of the chosen vector register size are loaded from memory or a scalar value at the specified address is loaded from memory and broadcasted to all entries of the vector register (e.g., using broadcast circuitry 211). In some embodiments, both of those variants cause a load of a temporal vector register and then the operation proceeds as if operating on 3 vector registers. An embodiment may choose different micro-architectural for handlings the fused memory operand.

The packed data sources 201 and 203 and packed data source/destination 231 are fed into execution circuitry 209 to be operated on. In some embodiments, In particular, execution circuitry 209 performs a FMA operation according to the opcode. For example, the execution of: 1) VFNMADD132NEPBF16 multiplies the packed BF16 values from the first source operand to the packed BF16 values in the third source operand, adds the negated infinite precision intermediate result to the packed BF16 values in the second source operand, performs rounding and stores the resulting packed BF16 values to the destination operand (first source operand); 2) VFNMADD213NEPBF16 multiplies the packed BF16 values from the second source operand to the packed BF16 values in the first source operand, adds the negated infinite precision intermediate result to the packed BF16 values in the third source operand, performs rounding and stores the resulting packed BF16 values to the destination operand (first source operand); 3) VFNMADD231NEPBF16 multiplies the packed BF16 values from the second source to the packed BF16 values in the third source operand, adds the negated infinite precision intermediate result to the packed BF16 values in the first source operand, performs rounding and stores the resulting packed BF16 values to the destination operand (first source operand); 4) VFMADD132NEPBF16 multiplies the packed BF16 values from the first source operand to the packed BF16 values in the third source operand. From the infinite precision intermediate result, subtracts the packed BF16 values in the second source operand, performs rounding and stores the resulting BF16 values to the destination operand (first source operand); 5) VFMADD213NEPBF16 multiplies the packed BF16 values from the second source operand to the packed BF16 values in the first source operand. From the infinite precision intermediate result, subtracts the packed BF16 values in the third source operand, performs rounding and stores the resulting BF16 values to the destination operand (first source operand); 6) VFMADD231NEPBF16 multiplies the packed BF16 values from the second source to the packed BF16 values in the third source operand. From the infinite precision intermediate result, subtracts the packed BF16 values in the first source operand, performs rounding and stores the resulting BF16 values to the destination operand (first source operand); 7) VFNMSUB132NEPBF16 multiplies the packed BF16 values from the first source operand to the packed BF16 values in the third source operand, subtracts the negated infinite precision intermediate result to the packed BF16 values in the second source operand, performs rounding and stores the resulting packed BF16 values to the destination operand (first source operand); 8) VFNMSUB213NEPBF16 multiplies the packed BF16 values from the second source operand to the packed BF16 values in the first source operand, subtracts the negated infinite precision intermediate result to the packed BF16 values in the third source operand, performs rounding and stores the resulting packed BF16 values to the destination operand (first source operand); 9) VFNMSUB231NEPBF16 multiplies the packed BF16 values from the second source to the packed BF16 values in the third source operand, subtracts the negated infinite precision intermediate result to the packed BF16 values in the first source operand, performs rounding and stores the resulting packed BF16 values to the destination operand (first source operand); 10) VFMSUB132NEPBF16 multiplies the packed BF16 values from the first source operand to the packed BF16 values in the third source operand. From the infinite precision intermediate result, subtracts the packed BF16 values in the second source operand, performs rounding and stores the resulting BF16 values to the destination operand (first source operand); 11) VFMSUB213NEPBF16 multiplies the packed BF16 values from the second source operand to the packed BF16 values in the first source operand. From the infinite precision intermediate result, subtracts the packed BF16 values in the third source operand, performs rounding and stores the resulting BF16 values to the destination operand (first source operand); and 12) VFMSUB231NEPBF16 multiplies the packed BF16 values from the second source to the packed BF16 values in the third source operand. From the infinite precision intermediate result, subtracts the packed BF16 values in the first source operand, performs rounding and stores the resulting BF16 values to the destination operand (first source operand).

In some embodiments, this execution of the instruction uses a round to nearest (even) rounding mode. In some embodiments, output denormals are always flushed to zero and input denormals are always treated as zero.

The packed data destination 231 is written to store the resultant BF16 values in corresponding packed data elements as the packed data source 201. In some embodiments, when the instruction calls for the use of predication or writemasking, a writemask (or predicate) register 231 dictates how the resultant BF16 values are stored and/or zeroed using the writemask circuitry 221. In some embodiments, the results are calculated exactly, and then rounded to BF16.

Figure 3:
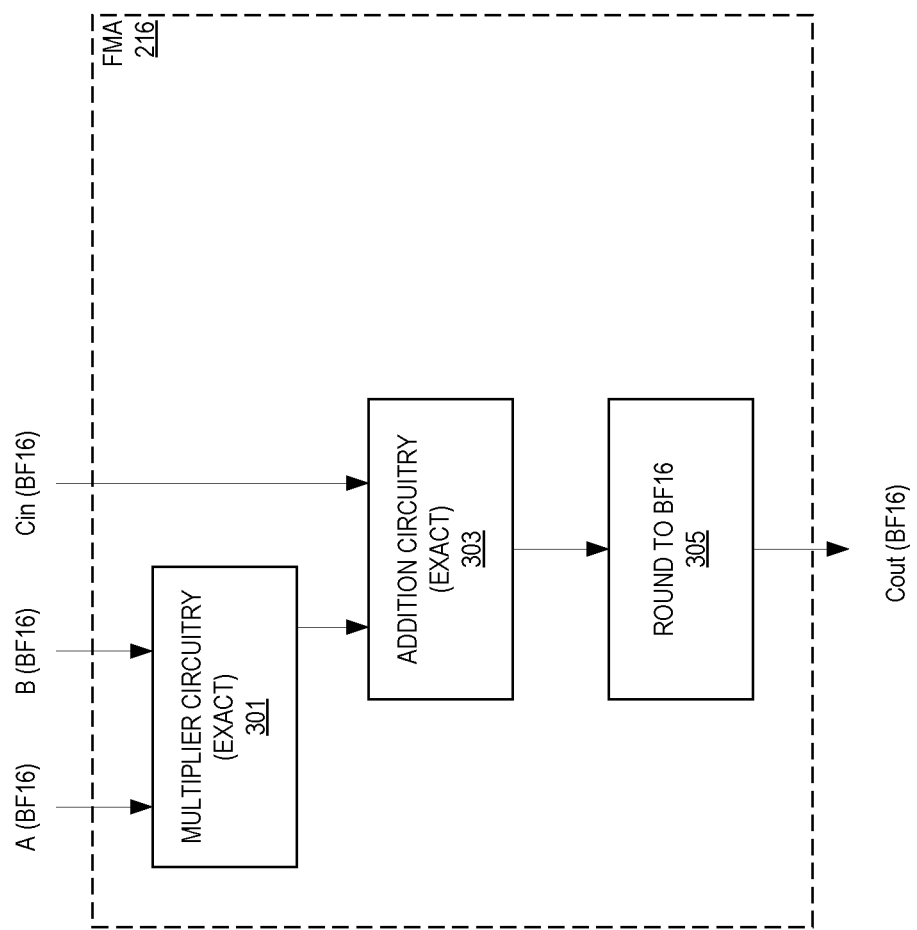
FIG. 3 illustrates embodiments of a FMA circuit.

FIG. 3 illustrates embodiments of a FMA circuit. For example, in some embodiments, this is FMA 216. A multiplier circuit 301 takes in two BF16 data elements and calculates a multiplication result exactly. Addition circuitry 303 takes in another BF16 data element and the multiplication result and adds them in an exact fashion. The output of the addition circuitry 303 is rounded to BF16 format using rounding circuitry 305.

FIG. 4 illustrates an embodiment of method performed by a processor to process a BF16 FMA instruction. For example, a processor core as shown in FIG. 10(B), a pipeline as detailed below, etc. performs this method.

At 401 an instruction is fetched having fields for an opcode, an identification of location of a packed data source/destination operand (first source), an identification of a location of a second packed data source operand, an identification of a location of a third packed data source operand, and an identification of location of a packed data source/destination operand, wherein the opcode is to indicate operand ordering and that execution circuitry is to, per data element position, perform a bf16 fused multiply-accumulate operation using the first, second, and third source operands and store a result in a corresponding data element position of the source/destination.

In some embodiments, the fetched instruction, of a first ISA, is translated into one or more instructions of a second, different ISA at 403. The one or more instructions of the second, different ISA, when executed, provided the same result as if the fetched instruction had been executed. Note the translation may be performed by hardware, software, or a combination thereof.

The instruction (or the translated one or more instructions) is/are decoded 405. This decoding may cause the generation of one or more micro-operations to be performed. Note that as this instruction Data values associated with the source operand of the decoded instruction are retrieved at 407. For example, when a source operand is stored in memory, the data from the indicated memory location is retrieved.

At 409, the decoded instruction(s) is/are executed by execution circuitry (hardware) such as that detailed herein. The execution circuitry is to, per data element position, perform a bf16 fused multiply-accumulate operation using the first, second, and third source operands and store a result in a corresponding data element position of the source/destination.

In some embodiments, the instruction is committed or retired at 411.

FIG. 5 illustrates exemplary embodiments of pseudo code representing the execution and format of BF16 FMA instruction. Note that EVEX.b maps to the b of prefix 1301(C). The comment of DAZ, FTZ, RNE, and SAE refer to the use of support for flush-to-zero (FTZ), denormals-are-zero (DAZ), suppress all exceptions (SAE), and round-to-even (RNE) rounding.

FIG. 6 illustrates exemplary embodiments of pseudo code representing the execution and format of BF16 FMA instruction. Note that EVEX.b maps to the b of prefix 1301(C). The comment of DAZ, FTZ, RNE, and SAE refer to the use of support for flush-to-zero (FTZ), denormals-are-zero (DAZ), suppress all exceptions (SAE), and round-to-even (RNE) rounding.

Figure 7:
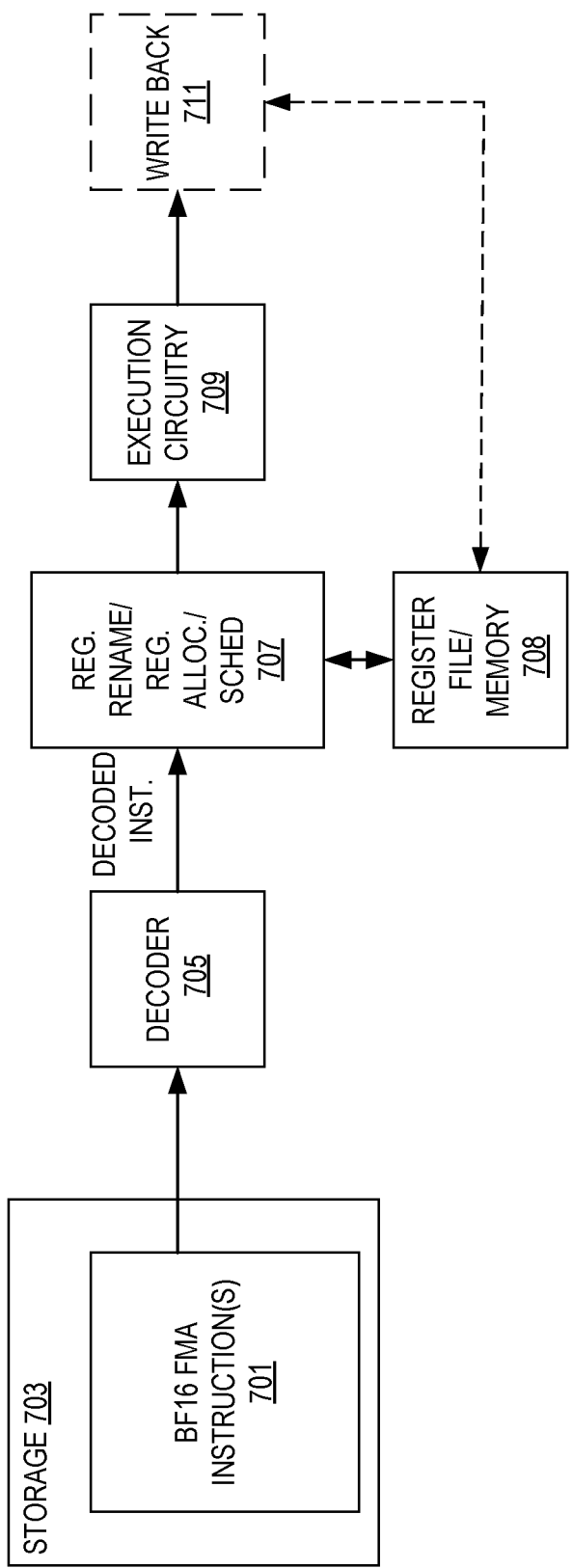
FIG. 7 illustrates embodiments of hardware to process an instruction such as the BF16 FMA instructions

FIG. 7 illustrates embodiments of hardware to process an instruction such as the BF16 FAM instructions. As illustrated, storage 703 stores a BF16 FMA instruction 701 to be executed.

The instruction 701 is received by decode circuitry 705. For example, the decode circuitry 705 receives this instruction from fetch logic/circuitry. The instruction includes fields for an opcode, first and second sources, and a destination. In some embodiments, the sources and destination are registers, and in other embodiments one or more are memory locations. In some embodiments, the opcode details which arithmetic operation is to be performed.

More detailed embodiments of at least one instruction format will be detailed later. The decode circuitry 705 decodes the instruction into one or more operations. In some embodiments, this decoding includes generating a plurality of micro-operations to be performed by execution circuitry (such as execution circuitry 709). The decode circuitry 705 also decodes instruction prefixes.

In some embodiments, register renaming, register allocation, and/or scheduling circuitry 707 provides functionality for one or more of: 1) renaming logical operand values to physical operand values (e.g., a register alias table in some embodiments), 2) allocating status bits and flags to the decoded instruction, and 3) scheduling the decoded instruction for execution on execution circuitry out of an instruction pool (e.g., using a reservation station in some embodiments).

Registers (register file) and/or memory 708 store data as operands of the instruction to be operated on by execution circuitry 709. Exemplary register types include packed data registers, general purpose registers, and floating-point registers.

Execution circuitry 709 executes the decoded instruction according to the opcode. Exemplary detailed execution circuitry is shown in FIGS. 2, 10, etc.

In some embodiments, retirement/write back circuitry 711 architecturally commits the result 708 and retires the instruction.

Exemplary Computer Architectures

Detailed below are describes of exemplary computer architectures, instruction formats, etc. that support the above instructions. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, handheld devices, and various other electronic devices, are also suitable. In general, a huge variety of systems or electronic devices capable of incorporating a processor and/or other execution logic as disclosed herein are generally suitable.

Figure 8:
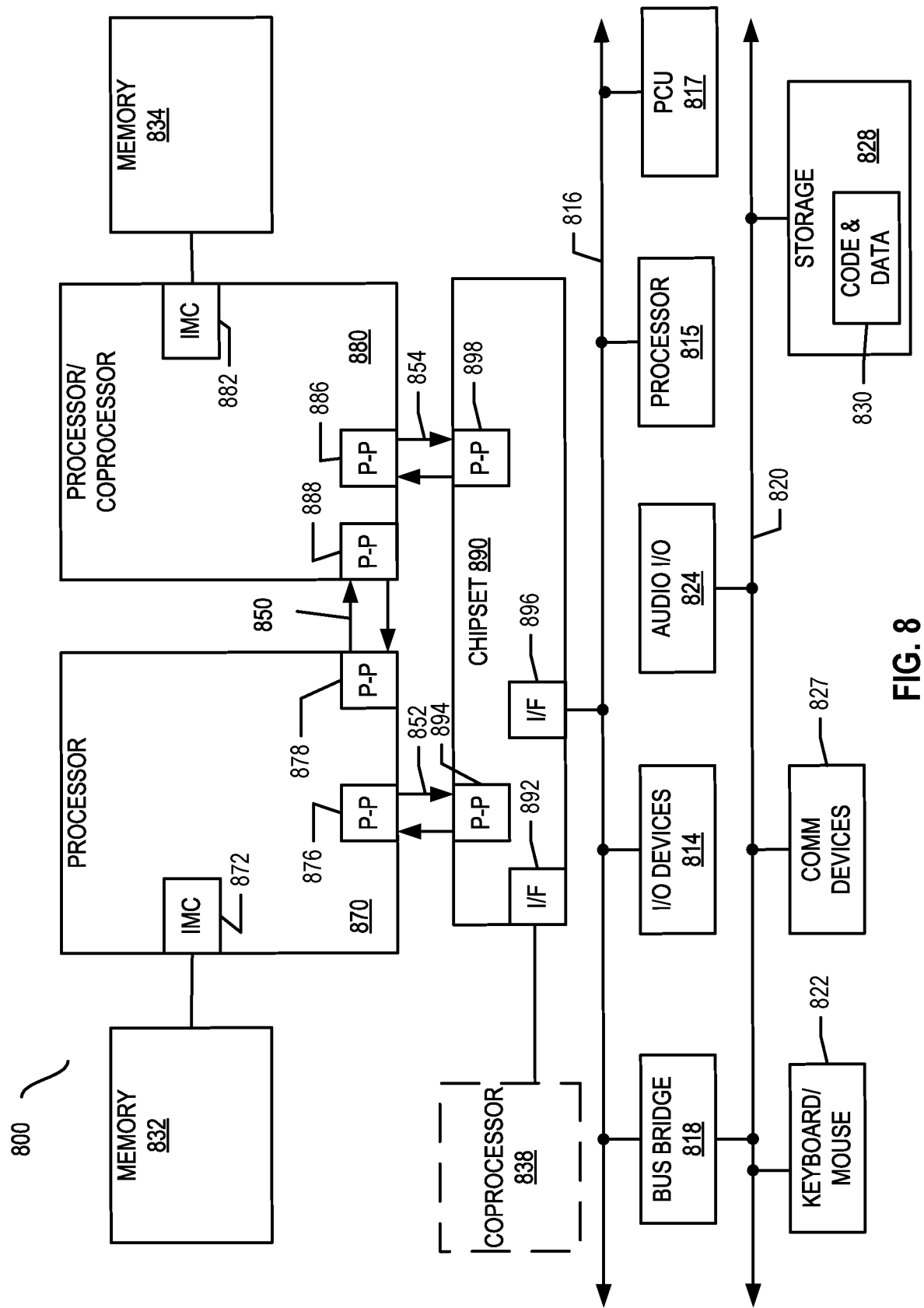
FIG. 8 illustrates embodiments of an exemplary system.

FIG. 8 illustrates embodiments of an exemplary system. Multiprocessor system 800 is a point-to-point interconnect system and includes a plurality of processors including a first processor 870 and a second processor 880 coupled via a point-to-point interconnect 850. In some embodiments, the first processor 870 and the second processor 880 are homogeneous. In some embodiments, first processor 870 and the second processor 880 are heterogenous.

Processors 870 and 880 are shown including integrated memory controller (IMC) units circuitry 872 and 882, respectively. Processor 870 also includes as part of its interconnect controller units point-to-point (P-P) interfaces 876 and 878; similarly, second processor 880 includes P-P interfaces 886 and 888. Processors 870, 880 may exchange information via the point-to-point (P-P) interconnect 850 using P-P interface circuits 878, 888. IMCs 872 and 882 couple the processors 870, 880 to respective memories, namely a memory 832 and a memory 834, which may be portions of main memory locally attached to the respective processors.

Processors 870, 880 may each exchange information with a chipset 890 via individual P-P interconnects 852, 854 using point to point interface circuits 876, 894, 886, 898. Chipset 890 may optionally exchange information with a coprocessor 838 via a high-performance interface 892. In some embodiments, the coprocessor 838 is a special-purpose processor, such as, for example, a high-throughput MIC processor, a network or communication processor, compression engine, graphics processor, GPGPU, embedded processor, or the like.

A shared cache (not shown) may be included in either processor 870, 880 or outside of both processors, yet connected with the processors via P-P interconnect, such that either or both processors' local cache information may be stored in the shared cache if a processor is placed into a low power mode.

Chipset 890 may be coupled to a first interconnect 816 via an interface 896. In some embodiments, first interconnect 816 may be a Peripheral Component Interconnect (PCI) interconnect, or an interconnect such as a PCI Express interconnect or another I/O interconnect. In some embodiments, one of the interconnects couples to a power control unit (PCU) 817, which may include circuitry, software, and/or firmware to perform power management operations with regard to the processors 870, 880 and/or co-processor 838. PCU 817 provides control information to a voltage regulator to cause the voltage regulator to generate the appropriate regulated voltage. PCU 817 also provides control information to control the operating voltage generated. In various embodiments, PCU 817 may include a variety of power management logic units (circuitry) to perform hardware-based power management. Such power management may be wholly processor controlled (e.g., by various processor hardware, and which may be triggered by workload and/or power, thermal or other processor constraints) and/or the power management may be performed responsive to external sources (such as a platform or power management source or system software).

PCU 817 is illustrated as being present as logic separate from the processor 870 and/or processor 880. In other cases, PCU 817 may execute on a given one or more of cores (not shown) of processor 870 or 880. In some cases, PCU 817 may be implemented as a microcontroller (dedicated or general-purpose) or other control logic configured to execute its own dedicated power management code, sometimes referred to as P-code. In yet other embodiments, power management operations to be performed by PCU 817 may be implemented externally to a processor, such as by way of a separate power management integrated circuit (PMIC) or another component external to the processor. In yet other embodiments, power management operations to be performed by PCU 817 may be implemented within BIOS or other system software.

Various I/O devices 814 may be coupled to first interconnect 816, along with an interconnect (bus) bridge 818 which couples first interconnect 816 to a second interconnect 820. In some embodiments, one or more additional processor(s) 815, such as coprocessors, high-throughput MIC processors, GPGPU's, accelerators (such as, e.g., graphics accelerators or digital signal processing (DSP) units), field programmable gate arrays (FPGAs), or any other processor, are coupled to first interconnect 816. In some embodiments, second interconnect 820 may be a low pin count (LPC) interconnect. Various devices may be coupled to second interconnect 820 including, for example, a keyboard and/or mouse 822, communication devices 827 and a storage unit circuitry 828. Storage unit circuitry 828 may be a disk drive or other mass storage device which may include instructions/code and data 830, in some embodiments. Further, an audio I/O 824 may be coupled to second interconnect 820. Note that other architectures than the point-to-point architecture described above are possible. For example, instead of the point-to-point architecture, a system such as multiprocessor system 800 may implement a multi-drop interconnect or other such architecture.

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die as the described CPU (sometimes referred to as the application core(s) or application processor(s)), the above described coprocessor, and additional functionality. Exemplary core architectures are described next, followed by descriptions of exemplary processors and computer architectures.

Figure 9:
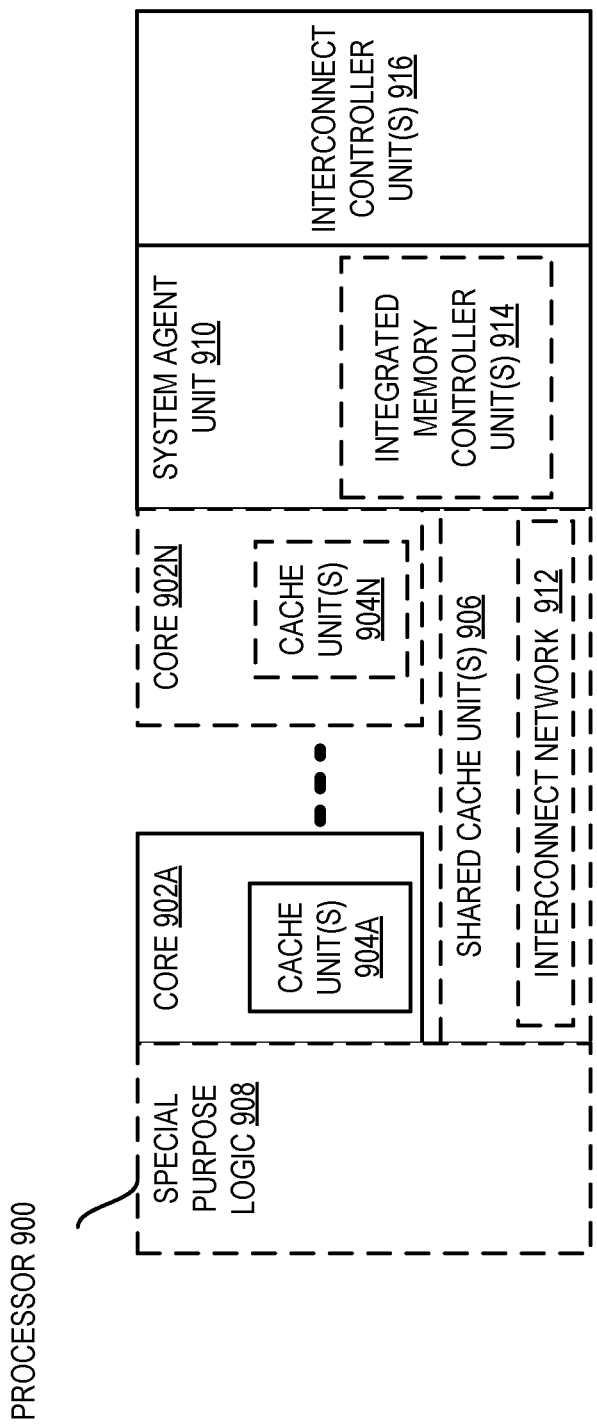
FIG. 9 illustrates a block diagram of embodiments of a processor that may have more than one core, may have an integrated memory controller, and may have integrated graphics.

FIG. 9 illustrates a block diagram of embodiments of a processor 900 that may have more than one core, may have an integrated memory controller, and may have integrated graphics. The solid lined boxes illustrate a processor 900 with a single core 902A, a system agent 910, a set of one or more interconnect controller units circuitry 916, while the optional addition of the dashed lined boxes illustrates an alternative processor 900 with multiple cores 902(A)-(N), a set of one or more integrated memory controller unit(s) circuitry 914 in the system agent unit circuitry 910, and special purpose logic 908, as well as a set of one or more interconnect controller units circuitry 916. Note that the processor 900 may be one of the processors 870 or 880, or co-processor 838 or 815 of FIG. 8.

Thus, different implementations of the processor 900 may include: 1) a CPU with the special purpose logic 908 being integrated graphics and/or scientific (throughput) logic (which may include one or more cores, not shown), and the cores 902(A)-(N) being one or more general purpose cores (e.g., general purpose in-order cores, general purpose out-of-order cores, or a combination of the two); 2) a coprocessor with the cores 902(A)-(N) being a large number of special purpose cores intended primarily for graphics and/or scientific (throughput); and 3) a coprocessor with the cores 902(A)-(N) being a large number of general purpose in-order cores. Thus, the processor 900 may be a general-purpose processor, coprocessor or special-purpose processor, such as, for example, a network or communication processor, compression engine, graphics processor, GPGPU (general purpose graphics processing unit circuitry), a high-throughput many integrated core (MIC) coprocessor (including 30 or more cores), embedded processor, or the like. The processor may be implemented on one or more chips. The processor 900 may be a part of and/or may be implemented on one or more substrates using any of a number of process technologies, such as, for example, BiCMOS, CMOS, or NMOS.

A memory hierarchy includes one or more levels of cache unit(s) circuitry 904(A)-(N) within the cores 902(A)-(N), a set of one or more shared cache units circuitry 906, and external memory (not shown) coupled to the set of integrated memory controller units circuitry 914. The set of one or more shared cache units circuitry 906 may include one or more mid-level caches, such as level 2 (L2), level 3 (L3), level 4 (L4), or other levels of cache, such as a last level cache (LLC), and/or combinations thereof. While in some embodiments ring-based interconnect network circuitry 912 interconnects the special purpose logic 908 (e.g., integrated graphics logic), the set of shared cache units circuitry 906, and the system agent unit circuitry 910, alternative embodiments use any number of well-known techniques for interconnecting such units. In some embodiments, coherency is maintained between one or more of the shared cache units circuitry 906 and cores 902(A)-(N).

In some embodiments, one or more of the cores 902(A)-(N) are capable of multi-threading. The system agent unit circuitry 910 includes those components coordinating and operating cores 902(A)-(N). The system agent unit circuitry 910 may include, for example, power control unit (PCU) circuitry and/or display unit circuitry (not shown). The PCU may be or may include logic and components needed for regulating the power state of the cores 902(A)-(N) and/or the special purpose logic 908 (e.g., integrated graphics logic). The display unit circuitry is for driving one or more externally connected displays.

The cores 902(A)-(N) may be homogenous or heterogeneous in terms of architecture instruction set; that is, two or more of the cores 902(A)-(N) may be capable of executing the same instruction set, while other cores may be capable of executing only a subset of that instruction set or a different instruction set.

Exemplary Core Architectures

In-Order and Out-of-Order Core Block Diagram

Figure 10A:
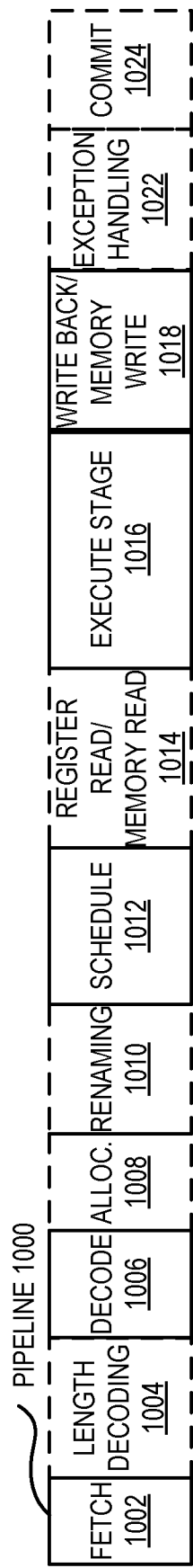
FIG. 10(A) is a block diagram illustrating both an exemplary in-order pipeline and an exemplary register renaming, out-of-order issue/execution pipeline according to embodiments of the invention.
Figure 10B:
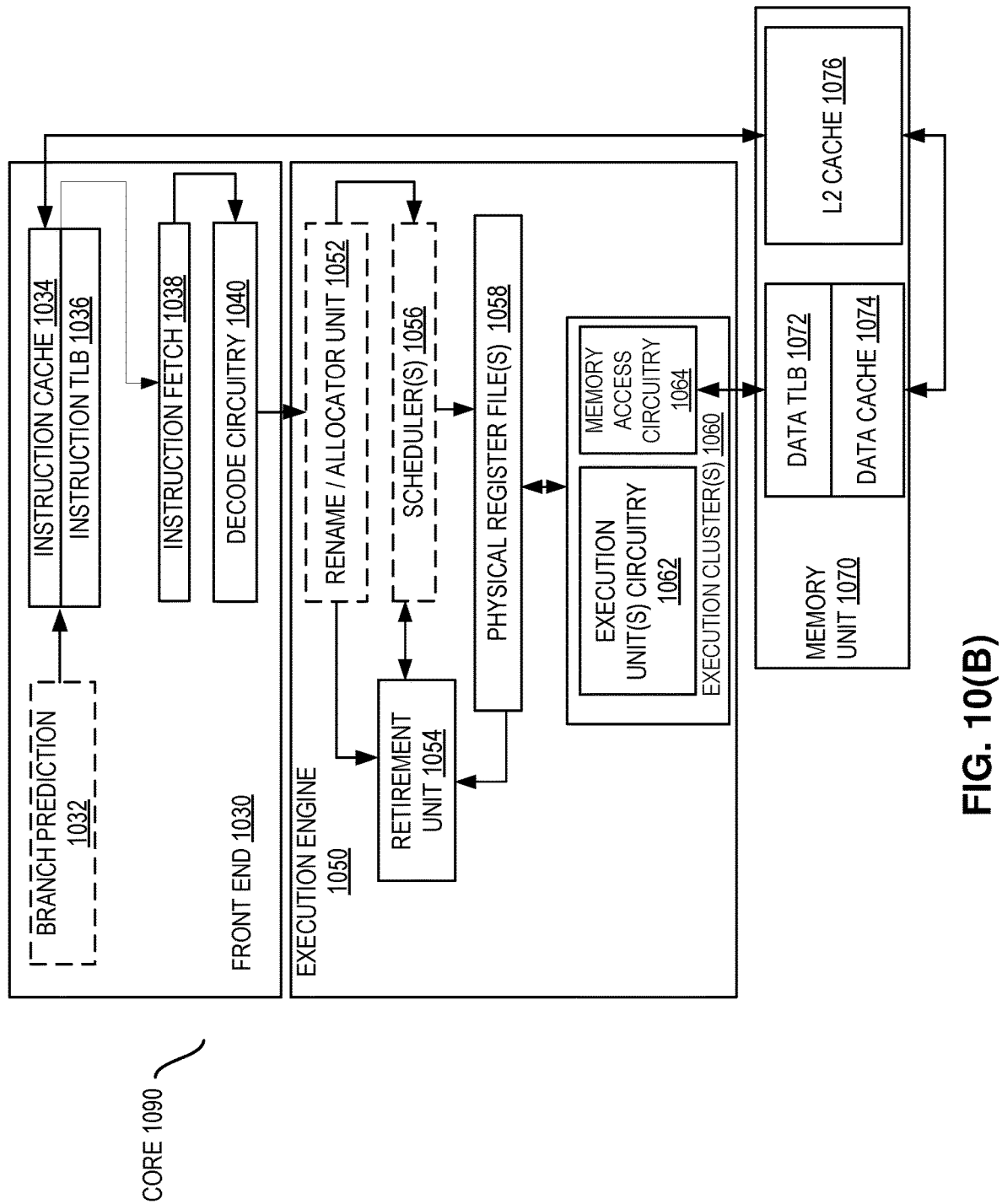
FIG. 10(B) is a block diagram illustrating both an exemplary embodiment of an in-order architecture core and an exemplary register renaming, out-of-order issue/execution architecture core to be included in a processor according to embodiments of the invention.

FIG. 10(A) is a block diagram illustrating both an exemplary in-order pipeline and an exemplary register renaming, out-of-order issue/execution pipeline according to embodiments of the invention. FIG. 10(B) is a block diagram illustrating both an exemplary embodiment of an in-order architecture core and an exemplary register renaming, out-of-order issue/execution architecture core to be included in a processor according to embodiments of the invention. The solid lined boxes in FIGS. 10(A)-(B) illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 10(A), a processor pipeline 1000 includes a fetch stage 1002, an optional length decode stage 1004, a decode stage 1006, an optional allocation stage 1008, an optional renaming stage 1010, a scheduling (also known as a dispatch or issue) stage 1012, an optional register read/memory read stage 1014, an execute stage 1016, a write back/memory write stage 1018, an optional exception handling stage 1022, and an optional commit stage 1024. One or more operations can be performed in each of these processor pipeline stages. For example, during the fetch stage 1002, one or more instructions are fetched from instruction memory, during the decode stage 1006, the one or more fetched instructions may be decoded, addresses (e.g., load store unit (LSU) addresses) using forwarded register ports may be generated, and branch forwarding (e.g., immediate offset or an link register (LR)) may be performed. In one embodiment, the decode stage 1006 and the register read/memory read stage 1014 may be combined into one pipeline stage. In one embodiment, during the execute stage 1016, the decoded instructions may be executed, LSU address/data pipelining to an Advanced Microcontroller Bus (AHB) interface may be performed, multiply and add operations may be performed, arithmetic operations with branch results may be performed, etc.

By way of example, the exemplary register renaming, out-of-order issue/execution core architecture may implement the pipeline 1000 as follows: 1) the instruction fetch 1038 performs the fetch and length decoding stages 1002 and 1004; 2) the decode unit circuitry 1040 performs the decode stage 1006; 3) the rename/allocator unit circuitry 1052 performs the allocation stage 1008 and renaming stage 1010; 4) the scheduler unit(s) circuitry 1056 performs the schedule stage 1012; 5) the physical register file(s) unit(s) circuitry 1058 and the memory unit circuitry 1070 perform the register read/memory read stage 1014; the execution cluster 1060 perform the execute stage 1016; 6) the memory unit circuitry 1070 and the physical register file(s) unit(s) circuitry 1058 perform the write back/memory write stage 1018; 7) various units (unit circuitry) may be involved in the exception handling stage 1022; and 8) the retirement unit circuitry 1054 and the physical register file(s) unit(s) circuitry 1058 perform the commit stage 1024.

FIG. 10(B) shows processor core 1090 including front-end unit circuitry 1030 coupled to an execution engine unit circuitry 1050, and both are coupled to a memory unit circuitry 1070. The core 1090 may be a reduced instruction set computing (RISC) core, a complex instruction set computing (CISC) core, a very long instruction word (VLIW) core, or a hybrid or alternative core type. As yet another option, the core 1090 may be a special-purpose core, such as, for example, a network or communication core, compression engine, coprocessor core, general purpose computing graphics processing unit (GPGPU) core, graphics core, or the like.

The front end unit circuitry 1030 may include branch prediction unit circuitry 1032 coupled to an instruction cache unit circuitry 1034, which is coupled to an instruction translation lookaside buffer (TLB) 1036, which is coupled to instruction fetch unit circuitry 1038, which is coupled to decode unit circuitry 1040. In one embodiment, the instruction cache unit circuitry 1034 is included in the memory unit circuitry 1070 rather than the front-end unit circuitry 1030. The decode unit circuitry 1040 (or decoder) may decode instructions, and generate as an output one or more micro-operations, micro-code entry points, microinstructions, other instructions, or other control signals, which are decoded from, or which otherwise reflect, or are derived from, the original instructions. The decode unit circuitry 1040 may further include an address generation unit circuitry (AGU, not shown). In one embodiment, the AGU generates an LSU address using forwarded register ports, and may further perform branch forwarding (e.g., immediate offset branch forwarding, LR register branch forwarding, etc.). The decode unit circuitry 1040 may be implemented using various different mechanisms. Examples of suitable mechanisms include, but are not limited to, look-up tables, hardware implementations, programmable logic arrays (PLAs), microcode read only memories (ROMs), etc. In one embodiment, the core 1090 includes a microcode ROM (not shown) or other medium that stores microcode for certain macroinstructions (e.g., in decode unit circuitry 1040 or otherwise within the front end unit circuitry 1030). In one embodiment, the decode unit circuitry 1040 includes a micro-operation (micro-op) or operation cache (not shown) to hold/cache decoded operations, micro-tags, or micro-operations generated during the decode or other stages of the processor pipeline 1000. The decode unit circuitry 1040 may be coupled to rename/allocator unit circuitry 1052 in the execution engine unit circuitry 1050.

The execution engine circuitry 1050 includes the rename/allocator unit circuitry 1052 coupled to a retirement unit circuitry 1054 and a set of one or more scheduler(s) circuitry 1056. The scheduler(s) circuitry 1056 represents any number of different schedulers, including reservations stations, central instruction window, etc. In some embodiments, the scheduler(s) circuitry 1056 can include arithmetic logic unit (ALU) scheduler/scheduling circuitry, ALU queues, arithmetic generation unit (AGU) scheduler/scheduling circuitry, AGU queues, etc. The scheduler(s) circuitry 1056 is coupled to the physical register file(s) circuitry 1058. Each of the physical register file(s) circuitry 1058 represents one or more physical register files, different ones of which store one or more different data types, such as scalar integer, scalar floating-point, packed integer, packed floating-point, vector integer, vector floating-point, status (e.g., an instruction pointer that is the address of the next instruction to be executed), etc. In one embodiment, the physical register file(s) unit circuitry 1058 includes vector registers unit circuitry, writemask registers unit circuitry, and scalar register unit circuitry. These register units may provide architectural vector registers, vector mask registers, general-purpose registers, etc. The physical register file(s) unit(s) circuitry 1058 is overlapped by the retirement unit circuitry 1054 (also known as a retire queue or a retirement queue) to illustrate various ways in which register renaming and out-of-order execution may be implemented (e.g., using a reorder buffer(s) (ROB(s)) and a retirement register file(s); using a future file(s), a history buffer(s), and a retirement register file(s); using a register maps and a pool of registers; etc.). The retirement unit circuitry 1054 and the physical register file(s) circuitry 1058 are coupled to the execution cluster(s) 1060. The execution cluster(s) 1060 includes a set of one or more execution units circuitry 1062 and a set of one or more memory access circuitry 1064. The execution units circuitry 1062 may perform various arithmetic, logic, floating-point or other types of operations (e.g., shifts, addition, subtraction, multiplication) and on various types of data (e.g., scalar floating-point, packed integer, packed floating-point, vector integer, vector floating-point). While some embodiments may include a number of execution units or execution unit circuitry dedicated to specific functions or sets of functions, other embodiments may include only one execution unit circuitry or multiple execution units/execution unit circuitry that all perform all functions. The scheduler(s) circuitry 1056, physical register file(s) unit(s) circuitry 1058, and execution cluster(s) 1060 are shown as being possibly plural because certain embodiments create separate pipelines for certain types of data/operations (e.g., a scalar integer pipeline, a scalar floating-point/packed integer/packed floating-point/vector integer/vector floating-point pipeline, and/or a memory access pipeline that each have their own scheduler circuitry, physical register file(s) unit circuitry, and/or execution cluster—and in the case of a separate memory access pipeline, certain embodiments are implemented in which only the execution cluster of this pipeline has the memory access unit(s) circuitry 1064). It should also be understood that where separate pipelines are used, one or more of these pipelines may be out-of-order issue/execution and the rest in-order.

In some embodiments, the execution engine unit circuitry 1050 may perform load store unit (LSU) address/data pipelining to an Advanced Microcontroller Bus (AHB) interface (not shown), and address phase and writeback, data phase load, store, and branches.

The set of memory access circuitry 1064 is coupled to the memory unit circuitry 1070, which includes data TLB unit circuitry 1072 coupled to a data cache circuitry 1074 coupled to a level 2 (L2) cache circuitry 1076. In one exemplary embodiment, the memory access units circuitry 1064 may include a load unit circuitry, a store address unit circuit, and a store data unit circuitry, each of which is coupled to the data TLB circuitry 1072 in the memory unit circuitry 1070. The instruction cache circuitry 1034 is further coupled to a level 2 (L2) cache unit circuitry 1076 in the memory unit circuitry 1070. In one embodiment, the instruction cache 1034 and the data cache 1074 are combined into a single instruction and data cache (not shown) in L2 cache unit circuitry 1076, a level 3 (L3) cache unit circuitry (not shown), and/or main memory. The L2 cache unit circuitry 1076 is coupled to one or more other levels of cache and eventually to a main memory.

The core 1090 may support one or more instructions sets (e.g., the x86 instruction set (with some extensions that have been added with newer versions); the MIPS instruction set; the ARM instruction set (with optional additional extensions such as NEON)), including the instruction(s) described herein. In one embodiment, the core 1090 includes logic to support a packed data instruction set extension (e.g., AVX1, AVX2), thereby allowing the operations used by many multimedia applications to be performed using packed data.

Exemplary Execution Unit(s) Circuitry

Figure 11:
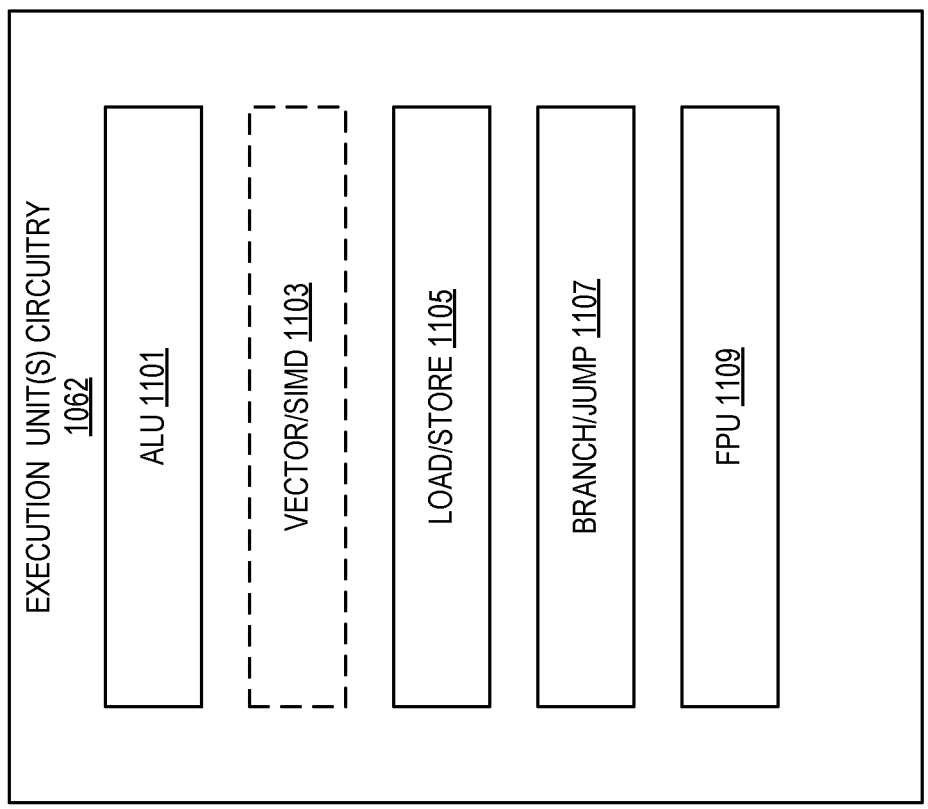
FIG. 11 illustrates embodiments of execution unit(s) circuitry, such as execution unit(s) circuitry of FIG. 10(B).

FIG. 11 illustrates embodiments of execution unit(s) circuitry, such as execution unit(s) circuitry 1062 of FIG. 10(B). As illustrated, execution unit(s) circuitry 1062 may include one or more ALU circuits 1101, vector/SIMD unit circuits 1103, load/store unit circuits 1105, and/or branch/jump unit circuits 1107. ALU circuits 1101 perform integer arithmetic and/or Boolean operations. Vector/SIMD unit circuits 1103 perform vector/SIMD operations on packed data (such as SIMD/vector registers). Load/store unit circuits 1105 execute load and store instructions to load data from memory into registers or store from registers to memory. Load/store unit circuits 1105 may also generate addresses. Branch/jump unit circuits 1107 cause a branch or jump to a memory address depending on the instruction. Floating-point unit (FPU) circuits 1109 perform floating-point arithmetic. The width of the execution unit(s) circuitry 1062 varies depending upon the embodiment and can range from 16-bit to 1,024-bit. In some embodiments, two or more smaller execution units are logically combined to form a larger execution unit (e.g., two 128-bit execution units are logically combined to form a 256-bit execution unit).

Exemplary Register Architecture

Figure 12:
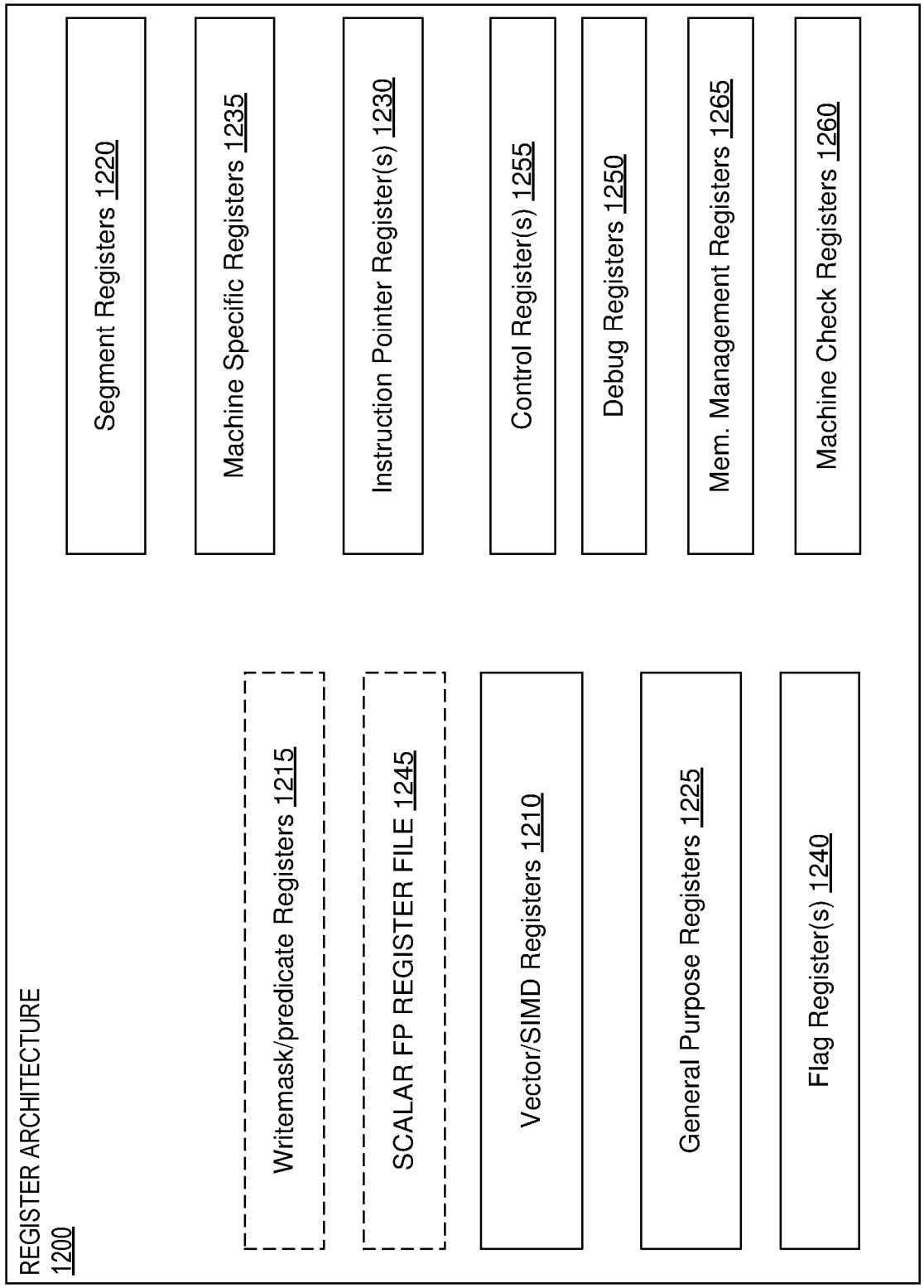
FIG. 12 is a block diagram of a register architecture according to some embodiments.

FIG. 12 is a block diagram of a register architecture 1200 according to some embodiments. As illustrated, there are vector/SIMD registers 1210 that vary from 128-bit to 1,024 bits width. In some embodiments, the vector/SIMD registers 1210 are physically 512-bits and, depending upon the mapping, only some of the lower bits are used. For example, in some embodiments, the vector/SIMD registers 1210 are ZMM registers which are 512 bits: the lower 256 bits are used for YMM registers and the lower 128 bits are used for XMM registers. As such, there is an overlay of registers. In some embodiments, a vector length field selects between a maximum length and one or more other shorter lengths, where each such shorter length is half the length of the preceding length. Scalar operations are operations performed on the lowest order data element position in a ZMM/YMM/XMM register; the higher order data element positions are either left the same as they were prior to the instruction or zeroed depending on the embodiment.

In some embodiments, the register architecture 1200 includes writemask/predicate registers 1215. For example, in some embodiments, there are 8 writemask/predicate registers (sometimes called k0 through k7) that are each 16-bit, 32-bit, 64-bit, or 128-bit in size. Writemask/predicate registers 1215 may allow for merging (e.g., allowing any set of elements in the destination to be protected from updates during the execution of any operation) and/or zeroing (e.g., zeroing vector masks allow any set of elements in the destination to be zeroed during the execution of any operation). In some embodiments, each data element position in a given writemask/predicate register 1215 corresponds to a data element position of the destination. In other embodiments, the writemask/predicate registers 1215 are scalable and consists of a set number of enable bits for a given vector element (e.g., 8 enable bits per 64-bit vector element).

The register architecture 1200 includes a plurality of general-purpose registers 1225. These registers may be 16-bit, 32-bit, 64-bit, etc. and can be used for scalar operations. In some embodiments, these registers are referenced by the names RAX, RBX, RCX, RDX, RBP, RSI, RDI, RSP, and R8 through R15.

In some embodiments, the register architecture 1200 includes scalar floating-point register 1245 which is used for scalar floating-point operations on 32/64/80-bit floating-point data using the x87 instruction set extension or as MMX registers to perform operations on 64-bit packed integer data, as well as to hold operands for some operations performed between the MMX and XMM registers.

One or more flag registers 1240 (e.g., EFLAGS, RFLAGS, etc.) store status and control information for arithmetic, compare, and system operations. For example, the one or more flag registers 1240 may store condition code information such as carry, parity, auxiliary carry, zero, sign, and overflow. In some embodiments, the one or more flag registers 1240 are called program status and control registers.

Segment registers 1220 contain segment points for use in accessing memory. In some embodiments, these registers are referenced by the names CS, DS, SS, ES, FS, and GS.

Machine specific registers (MSRs) 1235 control and report on processor performance. Most MSRs 1235 handle system-related functions and are not accessible to an application program. Machine check registers 1260 consist of control, status, and error reporting MSRs that are used to detect and report on hardware errors.

One or more instruction pointer register(s) 1230 store an instruction pointer value. Control register(s) 1255 (e.g., CR0-CR4) determine the operating mode of a processor (e.g., processor 870, 880, 838, 815, and/or 900) and the characteristics of a currently executing task. Debug registers 1250 control and allow for the monitoring of a processor or core's debugging operations.

Memory management registers 1265 specify the locations of data structures used in protected mode memory management. These registers may include a GDTR, IDRT, task register, and a LDTR register.

Alternative embodiments of the invention may use wider or narrower registers. Additionally, alternative embodiments of the invention may use more, less, or different register files and registers.

Instruction Sets

An instruction set architecture (ISA) may include one or more instruction formats. A given instruction format may define various fields (e.g., number of bits, location of bits) to specify, among other things, the operation to be performed (e.g., opcode) and the operand(s) on which that operation is to be performed and/or other data field(s) (e.g., mask). Some instruction formats are further broken down though the definition of instruction templates (or sub-formats). For example, the instruction templates of a given instruction format may be defined to have different subsets of the instruction format's fields (the included fields are typically in the same order, but at least some have different bit positions because there are less fields included) and/or defined to have a given field interpreted differently. Thus, each instruction of an ISA is expressed using a given instruction format (and, if defined, in a given one of the instruction templates of that instruction format) and includes fields for specifying the operation and the operands. For example, an exemplary ADD instruction has a specific opcode and an instruction format that includes an opcode field to specify that opcode and operand fields to select operands (source1/destination and source2); and an occurrence of this ADD instruction in an instruction stream will have specific contents in the operand fields that select specific operands.

Exemplary Instruction Formats

Embodiments of the instruction(s) described herein may be embodied in different formats. Additionally, exemplary systems, architectures, and pipelines are detailed below. Embodiments of the instruction(s) may be executed on such systems, architectures, and pipelines, but are not limited to those detailed.

Figure 13:
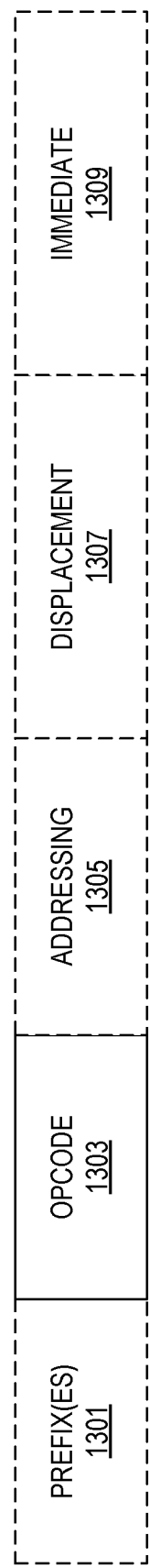
FIG. 13 illustrates embodiments of an instruction format.

FIG. 13 illustrates embodiments of an instruction format. As illustrated, an instruction may include multiple components including, but not limited to, one or more fields for: one or more prefixes 1301, an opcode 1303, addressing information 1305 (e.g., register identifiers, memory addressing information, etc.), a displacement value 1307, and/or an immediate 1309. Note that some instructions utilize some or all of the fields of the format whereas others may only use the field for the opcode 1303. In some embodiments, the order illustrated is the order in which these fields are to be encoded, however, it should be appreciated that in other embodiments these fields may be encoded in a different order, combined, etc.

The prefix(es) field(s) 1301, when used, modifies an instruction. In some embodiments, one or more prefixes are used to repeat string instructions (e.g., 0xF0, 0xF2, 0xF3, etc.), to provide section overrides (e.g., 0x2E, 0x36, 0x3E, 0x26, 0x64, 0x65, 0x2E, 0x3E, etc.), to perform bus lock operations, and/or to change operand (e.g., 0x66) and address sizes (e.g., 0x67). Certain instructions require a mandatory prefix (e.g., 0x66, 0xF2, 0xF3, etc.). Certain of these prefixes may be considered "legacy" prefixes. Other prefixes, one or more examples of which are detailed herein, indicate, and/or provide further capability, such as specifying particular registers, etc. The other prefixes typically follow the "legacy" prefixes.

The opcode field 1303 is used to at least partially define the operation to be performed upon a decoding of the instruction. In some embodiments, a primary opcode encoded in the opcode field 1303 is 1, 2, or 3 bytes in length. In other embodiments, a primary opcode can be a different length. An additional 3-bit opcode field is sometimes encoded in another field.

Figure 14:
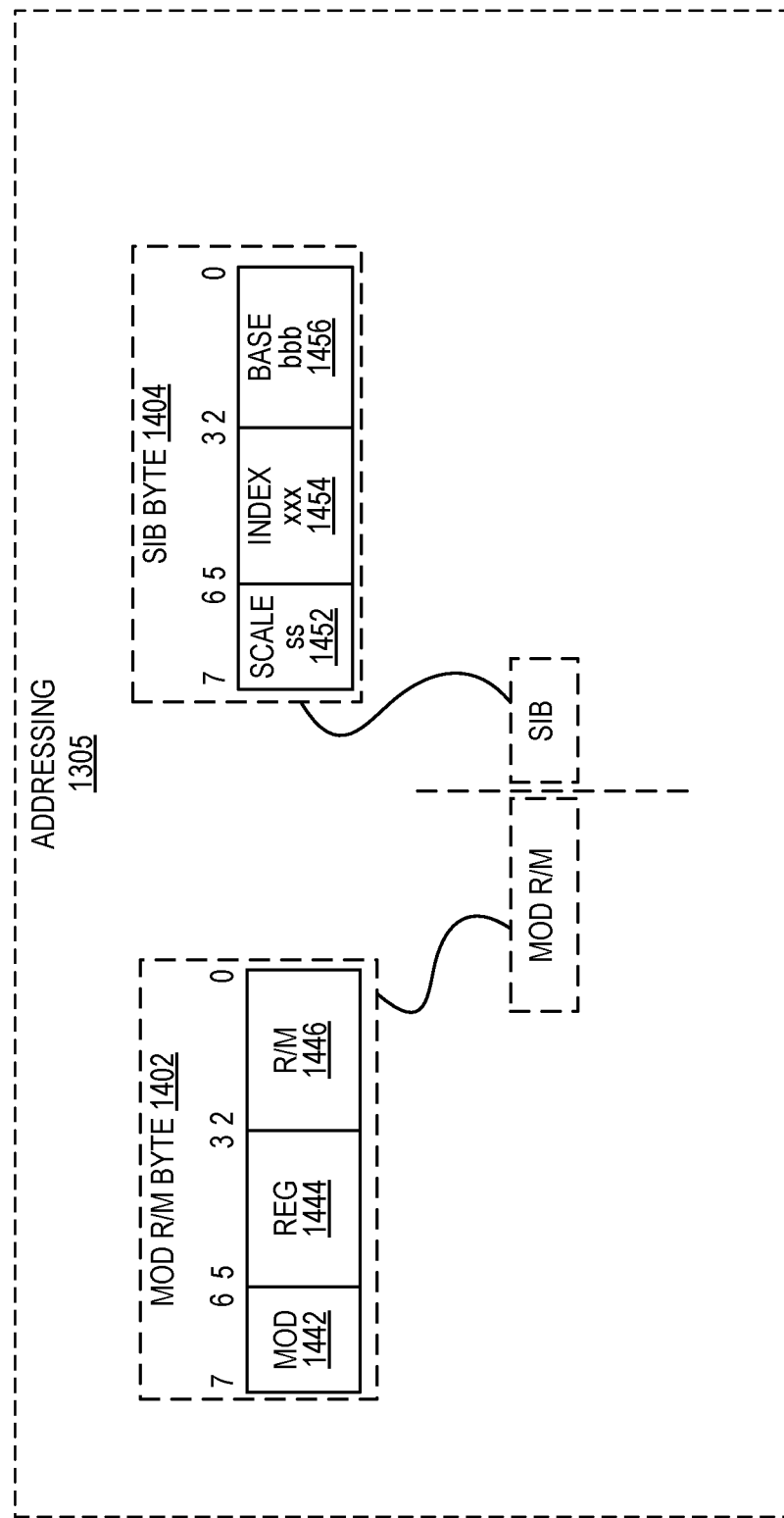
FIG. 14 illustrates embodiments of an addressing field.

The addressing field 1305 is used to address one or more operands of the instruction, such as a location in memory or one or more registers. FIG. 14 illustrates embodiments of the addressing field 1305. In this illustration, an optional ModR/M byte 1402 and an optional Scale, Index, Base (SIB) byte 1404 are shown. The ModR/M byte 1402 and the SIB byte 1404 are used to encode up to two operands of an instruction, each of which is a direct register or effective memory address. Note that each of these fields are optional in that not all instructions include one or more of these fields. The MOD R/M byte 1402 includes a MOD field 1442, a register field 1444, and R/M field 1446.

The content of the MOD field 1442 distinguishes between memory access and non-memory access modes. In some embodiments, when the MOD field 1442 has a value of b11, a register-direct addressing mode is utilized, and otherwise register-indirect addressing is used.

The register field 1444 may encode either the destination register operand or a source register operand, or may encode an opcode extension and not be used to encode any instruction operand. The content of register index field 1444, directly or through address generation, specifies the locations of a source or destination operand (either in a register or in memory). In some embodiments, the register field 1444 is supplemented with an additional bit from a prefix (e.g., prefix 1301) to allow for greater addressing.

The R/M field 1446 may be used to encode an instruction operand that references a memory address, or may be used to encode either the destination register operand or a source register operand. Note the R/M field 1446 may be combined with the MOD field 1442 to dictate an addressing mode in some embodiments.

The SIB byte 1404 includes a scale field 1452, an index field 1454, and a base field 1456 to be used in the generation of an address. The scale field 1452 indicates scaling factor. The index field 1454 specifies an index register to use. In some embodiments, the index field 1454 is supplemented with an additional bit from a prefix (e.g., prefix 1301) to allow for greater addressing. The base field 1456 specifies a base register to use. In some embodiments, the base field 1456 is supplemented with an additional bit from a prefix (e.g., prefix 1301) to allow for greater addressing. In practice, the content of the scale field 1452 allows for the scaling of the content of the index field 1454 for memory address generation (e.g., for address generation that uses $2^{scale}*index+base$).

Some addressing forms utilize a displacement value to generate a memory address. For example, a memory address may be generated according to $2^{scale}*index+base+displacement$, index*scale+displacement, r/m+displacement, instruction pointer (RIP/EIP)+displacement, register+displacement, etc. The displacement may be a 1-byte, 2-byte, 4-byte, etc. value. In some embodiments, a displacement field 1307 provides this value. Additionally, in some embodiments, a displacement factor usage is encoded in the MOD field of the addressing field 1305 that indicates a compressed displacement scheme for which a displacement value is calculated by multiplying disp8 in conjunction with a scaling factor N that is determined based on the vector length, the value of a b bit, and the input element size of the instruction. The displacement value is stored in the displacement field 1307.

In some embodiments, an immediate field 1309 specifies an immediate for the instruction. An immediate may be encoded as a 1-byte value, a 2-byte value, a 4-byte value, etc.

Figure 15:
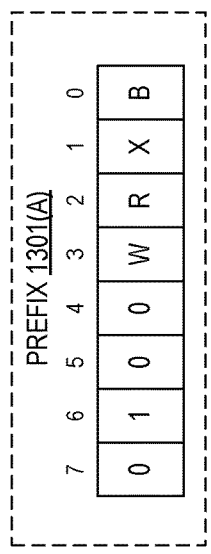
FIG. 15 illustrates embodiments of a first prefix.

FIG. 15 illustrates embodiments of a first prefix 1301(A). In some embodiments, the first prefix 1301(A) is an embodiment of a REX prefix. Instructions that use this prefix may specify general purpose registers, 64-bit packed data registers (e.g., single instruction, multiple data (SIM D) registers or vector registers), and/or control registers and debug registers (e.g., CR8-CR15 and DR8-DR15).

Instructions using the first prefix 1301(A) may specify up to three registers using 3-bit fields depending on the format: 1) using the reg field 1444 and the R/M field 1446 of the Mod R/M byte 1402; 2) using the Mod R/M byte 1402 with the SIB byte 1404 including using the reg field 1444 and the base field 1456 and index field 1454; or 3) using the register field of an opcode.

In the first prefix 1301(A), bit positions 7:4 are set as 0100. Bit position 3 (W) can be used to determine the operand size, but may not solely determine operand width. As such, when W=0, the operand size is determined by a code segment descriptor (CS.D) and when W=1, the operand size is 64-bit.

Note that the addition of another bit allows for 16 ($2^4$) registers to be addressed, whereas the MOD R/M reg field 1444 and MOD R/M R/M field 1446 alone can each only address 8 registers.

In the first prefix 1301(A), bit position 2 (R) may an extension of the MOD R/M reg field 1444 and may be used to modify the ModR/M reg field 1444 when that field encodes a general purpose register, a 64-bit packed data register (e.g., a SSE register), or a control or debug register. R is ignored when Mod R/M byte 1402 specifies other registers or defines an extended opcode.

Bit position 1 (X) X bit may modify the SIB byte index field 1454.

Bit position B (B) B may modify the base in the Mod R/M R/M field 1446 or the SIB byte base field 1456; or it may modify the opcode register field used for accessing general purpose registers (e.g., general purpose registers 1225).

Figure 16A:
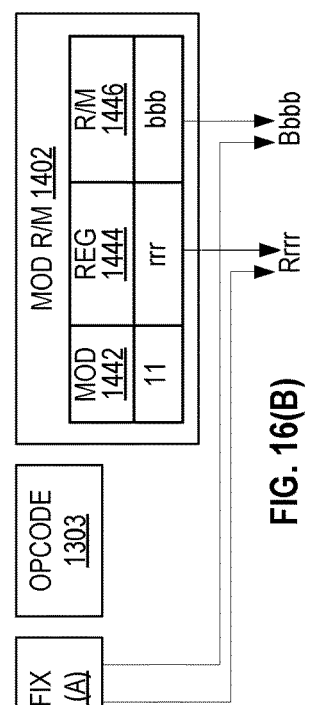
FIGS. 16(A)-(D) illustrate embodiments of how the R, X, and B fields of the first prefix 1301(A) are used.
Figure 16B:
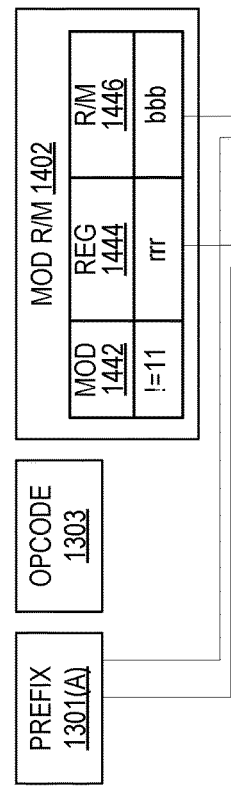
Figure 16C:
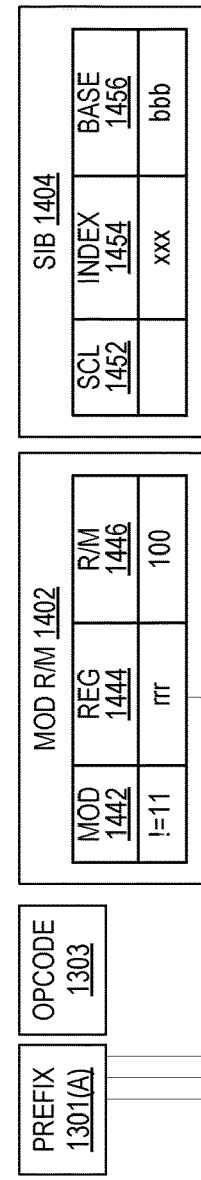
Figure 16D:
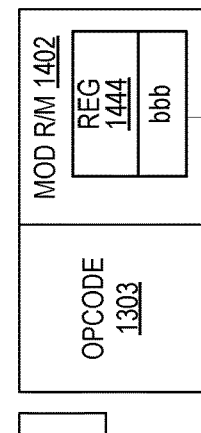

FIGS. 16(A)-(D) illustrate embodiments of how the R, X, and B fields of the first prefix 1301(A) are used. FIG. 16(A) illustrates R and B from the first prefix 1301(A) being used to extend the reg field 1444 and R/M field 1446 of the MOD R/M byte 1402 when the SIB byte 14 04 is not used for memory addressing. FIG. 16(B) illustrates R and B from the first prefix 1301(A) being used to extend the reg field 1444 and R/M field 1446 of the MOD R/M byte 1402 when the SIB byte 14 04 is not used (register-register addressing). FIG. 16(C) illustrates R, X, and B from the first prefix 1301(A) being used to extend the reg field 1444 of the MOD R/M byte 1402 and the index field 1454 and base field 1456 when the SIB byte 14 04 being used for memory addressing. FIG. 16(D) illustrates B from the first prefix 1301(A) being used to extend the reg field 1444 of the MOD R/M byte 1402 when a register is encoded in the opcode 1303.

Figure 17A:
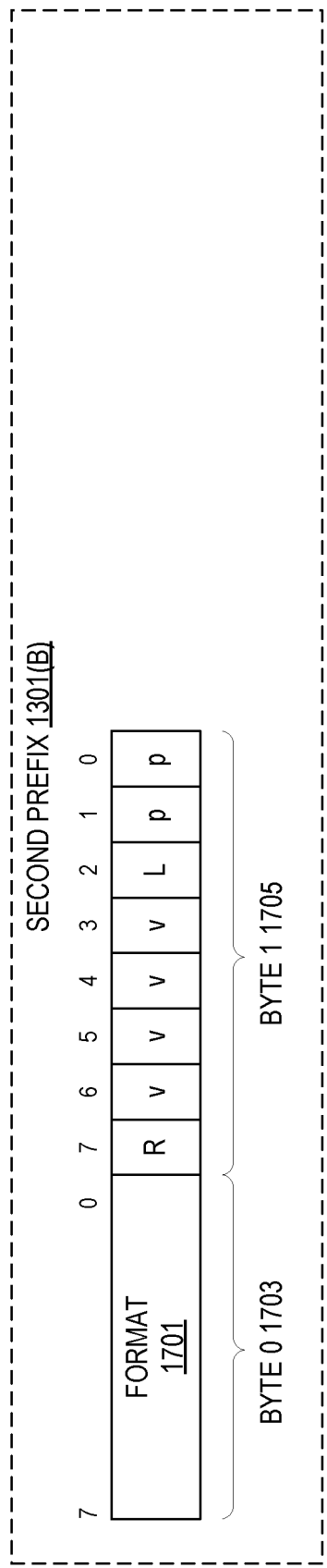
FIGS. 17(A)-(B) illustrate embodiments of a second prefix.
Figure 17B:
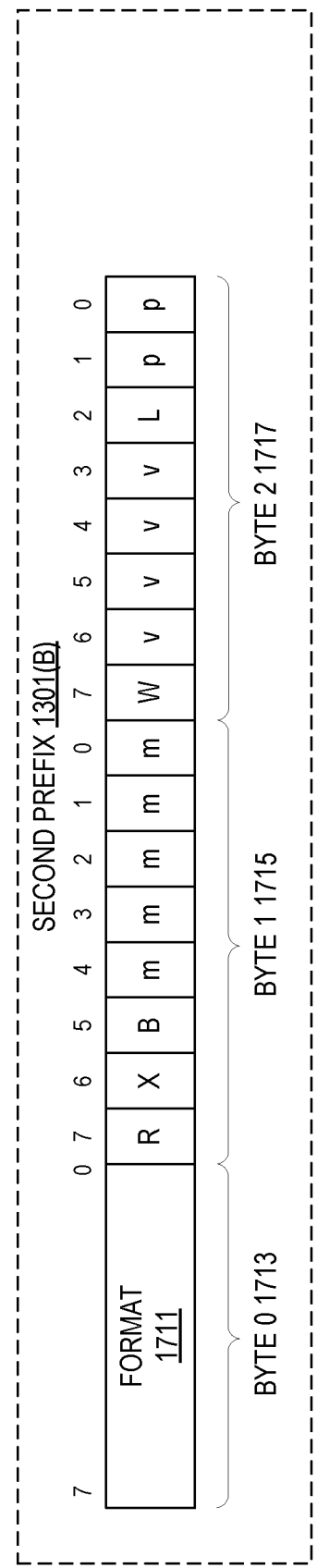

FIGS. 17(A)-(B) illustrate embodiments of a second prefix 1301(B). In some embodiments, the second prefix 1301(B) is an embodiment of a VEX prefix. The second prefix 1301(B) encoding allows instructions to have more than two operands, and allows SIMD vector registers (e.g., vector/SIMD registers 1210) to be longer than 64-bits (e.g., 128-bit and 256-bit). The use of the second prefix 1301(B) provides for three-operand (or more) syntax. For example, previous two-operand instructions performed operations such as A=A+B, which overwrites a source operand. The use of the second prefix 1301(B) enables operands to perform nondestructive operations such as A=B+C.

In some embodiments, the second prefix 1301(B) comes in two forms—a two-byte form and a three-byte form. The two-byte second prefix 1301(B) is used mainly for 128-bit, scalar, and some 256-bit instructions; while the three-byte second prefix 1301(B) provides a compact replacement of the first prefix 1301(A) and 3-byte opcode instructions.

FIG. 17(A) illustrates embodiments of a two-byte form of the second prefix 1301(B). In one example, a format field 1701 (byte 0 1703) contains the value C5H. In one example, byte 1 1705 includes a "R" value in bit[7]. This value is the complement of the same value of the first prefix 1301(A). Bit[2] is used to dictate the length (L) of the vector (where a value of 0 is a scalar or 128-bit vector and a value of 1 is a 256-bit vector). Bits[1:0] provide opcode extensionality equivalent to some legacy prefixes (e.g., 00=no prefix, 01=66H, 10=F3H, and 11=F2H). Bits[6:3] shown as vvvv may be used to: 1) encode the first source register operand, specified in inverted (1s complement) form and valid for instructions with 2 or more source operands; 2) encode the destination register operand, specified in 1s complement form for certain vector shifts; or 3) not encode any operand, the field is reserved and should contain a certain value, such as 1111b.

Instructions that use this prefix may use the Mod R/M R/M field 1446 to encode the instruction operand that references a memory address or encode either the destination register operand or a source register operand.

Instructions that use this prefix may use the Mod R/M reg field 1444 to encode either the destination register operand or a source register operand, be treated as an opcode extension and not used to encode any instruction operand.

For instruction syntax that support four operands, vvvv, the Mod R/M R/M field 1446 and the Mod R/M reg field 1444 encode three of the four operands. Bits[7:4] of the immediate 1309 are then used to encode the third source register operand.

FIG. 17(B) illustrates embodiments of a three-byte form of the second prefix 1301(B). in one example, a format field 1711 (byte 0 1713) contains the value C4H. Byte 1 1715 includes in bits[7:5] "R," "X," and "B" which are the complements of the same values of the first prefix 1301(A). Bits[4:0] of byte 1 1715 (shown as mmmmm) include content to encode, as need, one or more implied leading opcode bytes. For example, 00001 implies a 0FH leading opcode, 00010 implies a 0F38H leading opcode, 00011 implies a leading 0F3AH opcode, etc.

Bit[7] of byte 2 1717 is used similar to W of the first prefix 1301(A) including helping to determine promotable operand sizes. Bit[2] is used to dictate the length (L) of the vector (where a value of 0 is a scalar or 128-bit vector and a value of 1 is a 256-bit vector). Bits[1:0] provide opcode extensionality equivalent to some legacy prefixes (e.g., 00=no prefix, 01=66H, 10=F3H, and 11=F2H). Bits[6:3], shown as vvvv, may be used to: 1) encode the first source register operand, specified in inverted (1s complement) form and valid for instructions with 2 or more source operands; 2) encode the destination register operand, specified in 1s complement form for certain vector shifts; or 3) not encode any operand, the field is reserved and should contain a certain value, such as 1111b.

Instructions that use this prefix may use the Mod R/M R/M field 1446 to encode the instruction operand that references a memory address or encode either the destination register operand or a source register operand.

Instructions that use this prefix may use the Mod R/M reg field 1444 to encode either the destination register operand or a source register operand, be treated as an opcode extension and not used to encode any instruction operand.

For instruction syntax that support four operands, vvvv, the Mod R/M R/M field 1446, and the Mod R/M reg field 1444 encode three of the four operands. Bits[7:4] of the immediate 1309 are then used to encode the third source register operand.

Figure 18:
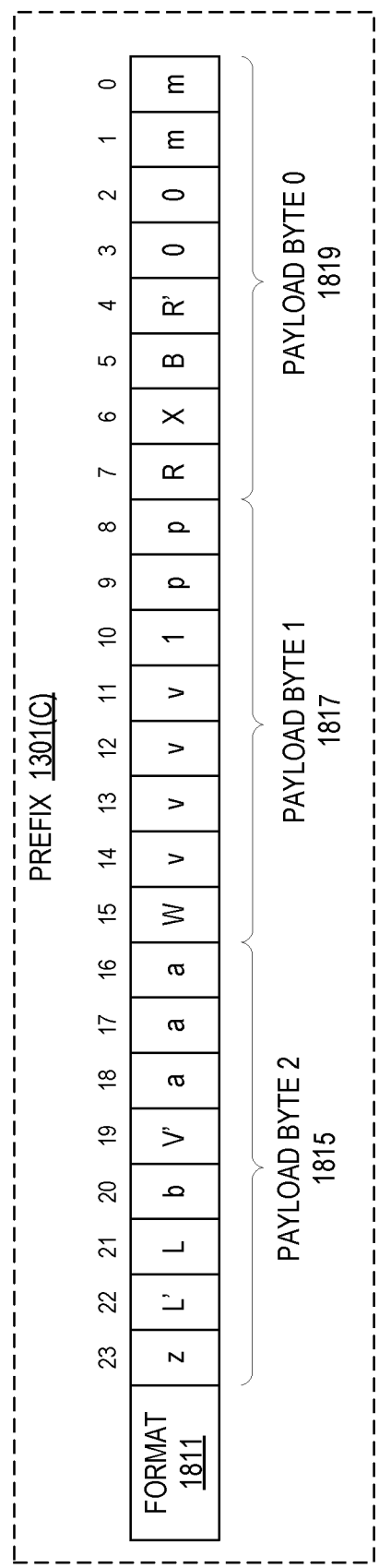
FIG. 18 illustrates embodiments of a third prefix.

FIG. 18 illustrates embodiments of a third prefix 1301(C). In some embodiments, the first prefix 1301(A) is an embodiment of an EVEX prefix. The third prefix 1301(C) is a four-byte prefix.

The third prefix 1301(C) can encode 32 vector registers (e.g., 128-bit, 256-bit, and 512-bit registers) in 64-bit mode. In some embodiments, instructions that utilize a writemask/opmask (see discussion of registers in a previous figure, such as FIG. 12) or predication utilize this prefix. Opmask register allow for conditional processing or selection control. Opmask instructions, whose source/destination operands are opmask registers and treat the content of an opmask register as a single value, are encoded using the second prefix 1301(B).

The third prefix 1301(C) may encode functionality that is specific to instruction classes (e.g., a packed instruction with "load+op" semantic can support embedded broadcast functionality, a floating-point instruction with rounding semantic can support static rounding functionality, a floating-point instruction with non-rounding arithmetic semantic can support "suppress all exceptions" functionality, etc.).

The first byte of the third prefix 1301(C) is a format field 1811 that has a value, in one example, of 62H. Subsequent bytes are referred to as payload bytes 1815-1819 and collectively form a 24-bit value of P[23:0] providing specific capability in the form of one or more fields (detailed herein).

In some embodiments, P[1:0] of payload byte 1819 are identical to the low two mmmmm bits. P[3:2] are reserved in some embodiments. Bit P[4] (R') allows access to the high 16 vector register set when combined with P[7] and the ModR/M reg field 1444. P[6] can also provide access to a high 16 vector register when SIB-type addressing is not needed. P[7:5] consist of an R, X, and B which are operand specifier modifier bits for vector register, general purpose register, memory addressing and allow access to the next set of 8 registers beyond the low 8 registers when combined with the ModR/M register field 1444 and ModR/M R/M field 1446. P[9:8] provide opcode extensionality equivalent to some legacy prefixes (e.g., 00=no prefix, 01=66H, 10=F3H, and 11=F2H). P[10] in some embodiments is a fixed value of 1. P[14:11], shown as vvvv, may be used to: 1) encode the first source register operand, specified in inverted (1s complement) form and valid for instructions with 2 or more source operands; 2) encode the destination register operand, specified in 1s complement form for certain vector shifts; or 3) not encode any operand, the field is reserved and should contain a certain value, such as 1111b.

P[15] is similar to W of the first prefix 1301(A) and second prefix 1311(B) and may serve as an opcode extension bit or operand size promotion.

P[18:16] specify the index of a register in the opmask (writemask) registers (e.g., writemask/predicate registers 1215). In one embodiment of the invention, the specific value aaa=000 has a special behavior implying no opmask is used for the particular instruction (this may be implemented in a variety of ways including the use of a opmask hardwired to all ones or hardware that bypasses the masking hardware). When merging, vector masks allow any set of elements in the destination to be protected from updates during the execution of any operation (specified by the base operation and the augmentation operation); in other one embodiment, preserving the old value of each element of the destination where the corresponding mask bit has a 0. In contrast, when zeroing vector masks allow any set of elements in the destination to be zeroed during the execution of any operation (specified by the base operation and the augmentation operation); in one embodiment, an element of the destination is set to 0 when the corresponding mask bit has a 0 value. A subset of this functionality is the ability to control the vector length of the operation being performed (that is, the span of elements being modified, from the first to the last one); however, it is not necessary that the elements that are modified be consecutive. Thus, the opmask field allows for partial vector operations, including loads, stores, arithmetic, logical, etc. While embodiments of the invention are described in which the opmask field's content selects one of a number of opmask registers that contains the opmask to be used (and thus the opmask field's content indirectly identifies that masking to be performed), alternative embodiments instead or additional allow the mask write field's content to directly specify the masking to be performed.

P[19] can be combined with P[14:11] to encode a second source vector register in a non-destructive source syntax which can access an upper 16 vector registers using P[19]. P[20] encodes multiple functionalities, which differs across different classes of instructions and can affect the meaning of the vector length/rounding control specifier field (P[22:21]). P[23] indicates support for merging-writemasking (e.g., when set to 0) or support for zeroing and merging-writemasking (e.g., when set to 1).

Exemplary embodiments of encoding of registers in instructions using the third prefix 1301(C) are detailed in the following tables.

TABLE 1

32-Register Support in 64-bit Mode

|  | 4 | 3 | [2:0] | REG. TYPE | COMMON USAGES |
|---|---|---|---|---|---|
| REG | R' | R | ModR/M reg | GPR, Vector | Destination or Source |
| VVVV | V' |  | vvvv | GPR, Vector | 2nd Source or Destination |
| RM |  | X | B ModR/M R/M | GPR, Vector | 1st Source or Destination |
| BASE |  | 0 | B ModR/M R/M | GPR | Memory addressing |
| INDEX |  | 0 | X SIB.index | GPR | Memory addressing |
| VIDX |  | V' | X SIB.index | Vector | VSIB memory addressing |

TABLE 2

Encoding Register Specifiers in 32-bit Mode

|  | [2:0] | REG. TYPE | COMMON USAGES |
|---|---|---|---|
| REG | ModR/M reg | GPR, Vector | Destination or Source |
| VVVV | vvvv | GPR, Vector | $2^{nd}$ Source or Destination |
| RM | ModR/M R/M | GPR, Vector | $1^{st}$ Source or Destination |
| BASE | ModR/M R/M | GPR | Memory addressing |
| INDEX | SIB.index | GPR | Memory addressing |
| VIDX | SIB.index | Vector | VSIB memory addressing |

TABLE 3

Opmask Register Specifier Encoding

|  | [2:0] | REG. TYPE | COMMON USAGES |
|---|---|---|---|
| REG | ModR/M Reg | k0-k7 | Source |
| VVVV | vvvv | k0-k7 | $2^{nd}$ Source |
| RM | ModR/M R/M | k0-7 | $1^{st}$ Source |
| {k1} | aaa | $k0^1$-k7 | Opmask |

Program code may be applied to input instructions to perform the functions described herein and generate output information. The output information may be applied to one or more output devices, in known fashion. For purposes of this application, a processing system includes any system that has a processor, such as, for example, a digital signal processor (DSP), a microcontroller, an application specific integrated circuit (ASIC), or a microprocessor.

The program code may be implemented in a high-level procedural or object-oriented programming language to communicate with a processing system. The program code may also be implemented in assembly or machine language, if desired. In fact, the mechanisms described herein are not limited in scope to any particular programming language. In any case, the language may be a compiled or interpreted language.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (Including Binary Translation, Code Morphing, Etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 19:
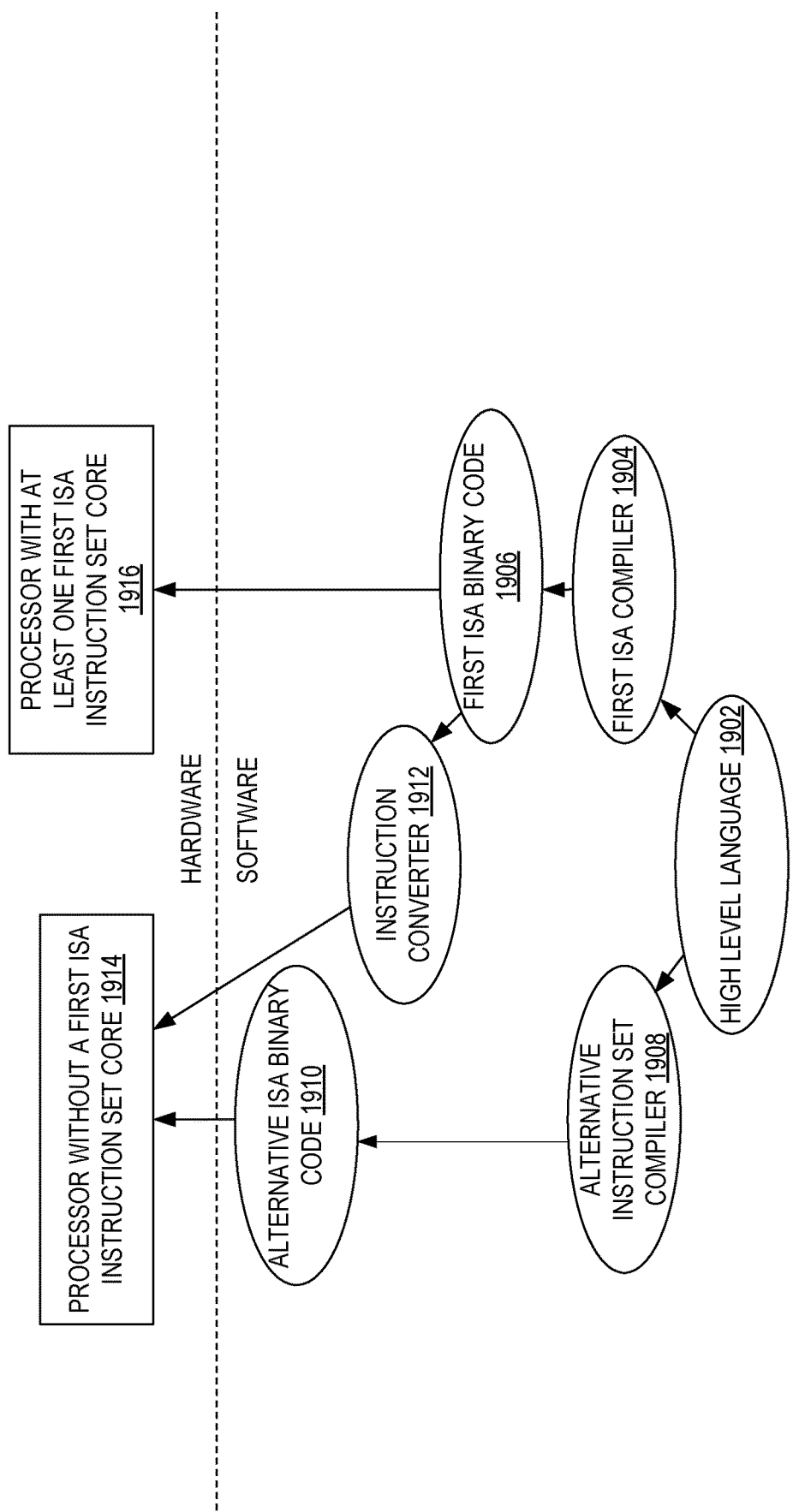
FIG. 19 illustrates a block diagram contrasting the use of a software instruction converter to convert binary instructions in a source instruction set to binary instructions in a target instruction set according to embodiments of the invention.

FIG. 19 illustrates a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 19 shows a program in a high-level language 1902 may be compiled using a first ISA compiler 1904 to generate first ISA binary code 1906 that may be natively executed by a processor with at least one first instruction set core 1916. The processor with at least one first ISA instruction set core 1916 represents any processor that can perform substantially the same functions as an Intel® processor with at least one first ISA instruction set core by compatibly executing or otherwise processing (1) a substantial portion of the instruction set of the first ISA instruction set core or (2) object code versions of applications or other software targeted to run on an Intel processor with at least one first ISA instruction set core, in order to achieve substantially the same result as a processor with at least one first ISA instruction set core. The first ISA compiler 1904 represents a compiler that is operable to generate first ISA binary code 1906 (e.g., object code) that can, with or without additional linkage processing, be executed on the processor with at least one first ISA instruction set core 1916. Similarly, FIG. 19 shows the program in the high-level language 1902 may be compiled using an alternative instruction set compiler 1908 to generate alternative instruction set binary code 1910 that may be natively executed by a processor without a first ISA instruction set core 1914. The instruction converter 1912 is used to convert the first ISA binary code 1906 into code that may be natively executed by the processor without a first ISA instruction set core 1914. This converted code is not likely to be the same as the alternative instruction set binary code 1910 because an instruction converter capable of this is difficult to make; however, the converted code will accomplish the general operation and be made up of instructions from the alternative instruction set. Thus, the instruction converter 1912 represents software, firmware, hardware, or a combination thereof that, through emulation, simulation or any other process, allows a processor or other electronic device that does not have a first ISA instruction set processor or core to execute the first ISA binary code 1906.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

Exemplary embodiments utilizing BF16 data elements include, but are not limited to:

1. An apparatus comprising:
   decoder circuitry to decode a single instruction, the single instruction to include fields for an opcode, an identification of location of a packed data source/destination operand (a first source), an identification of a location of a second packed data source operand, an identification of a location of a third packed data source operand, and an identification of location of a packed data source/destination operand, wherein the opcode is to indicate operand ordering and that execution circuitry is to, per data element position, perform a BF16 value fused multiply-accumulate operation using the first, second, and third source operands and store a result in a corresponding data element position of the source/destination operand; and execution circuitry to execute the decoded single instruction according to the opcode.

2. The apparatus of example 1, wherein the opcode is to indicate the fused multiply accumulation operation is per data element position multiplication of the BF16 value from the first source operand with the BF16 value in the third source operand to generate an infinite precision intermediate result, an addition of the infinite precision intermediate result negated to the BF16 values in the second source operand to generate an infinite precision addition result, and a round of the infinite precision addition result.

3. The apparatus of example 1, wherein the opcode is to indicate the fused multiply accumulation operation is per data element multiplication of the BF16 value from the second source operand with the BF16 value in the first source operand to generate an infinite precision intermediate result, an addition of the infinite precision intermediate result negated to the BF16 value in the third source operand to generate an infinite precision addition result, and a round of the infinite precision addition result.

4. The apparatus of example 1, wherein the opcode is to indicate the fused multiply accumulation operation is per data element multiplication of the BF16 value from the second source to the BF16 value in the third source operand to generate an infinite precision intermediate result, an addition of the infinite precision intermediate result negated to the BF16 value in the first source operand to generate an infinite precision addition result, and a round of the infinite precision addition result.

5. The apparatus of example 1, wherein the opcode is to indicate the fused multiply accumulation operation is per data element multiplication of the BF16 value from the second source operand to the BF16 value in the first source operand to generate an infinite precision intermediate result, an addition of a the BF16 value in the third source operand to generate an infinite precision addition result, and a round of the infinite precision addition result.

6. The apparatus of example 1, wherein the opcode is to indicate the fused multiply accumulation operation is per data element multiplication of the BF16 value from the first source operand to the BF16 value in the third source operand to generate an infinite precision intermediate result, an addition of a the BF16 value in the second source operand to generate an infinite precision addition result, and a round of the infinite precision addition result.

7. The apparatus of example 1, wherein the opcode is to indicate the fused multiply accumulation operation is per data element multiplication of the BF16 value from the second source to the BF16 value in the third source operand to generate an infinite precision intermediate result, an addition the BF16 value in the first source operand to generate an infinite precision addition result, and a round of the infinite precision addition result.

8. The apparatus of example 1, wherein the opcode is to indicate the fused multiply accumulation operation is per data element multiplication of the BF16 value from the first source operand to the BF16 value in the third source operand to generate an infinite precision intermediate result, a subtraction of the infinite precision intermediate result negated to the BF16 value in the second source operand to generate an infinite precision subtraction result, and a round of the infinite precision addition result.

9. The apparatus of example 1, wherein the opcode is to indicate the fused multiply accumulation operation is per data element multiplication of the BF16 value from the second source operand to the BF16 value in the first source operand to generate an infinite precision intermediate result, a subtraction of the infinite precision intermediate result negated to the BF16 value in the third source operand to generate an infinite precision subtraction result, and a round of the infinite precision addition result.

10. The apparatus of example 1, wherein the opcode is to indicate the fused multiply accumulation operation is per data element multiplication of the BF16 value from the second source to the BF16 value in the third source operand to generate an infinite precision intermediate result, a subtraction of the infinite precision intermediate result negated to the BF16 value in the first source operand to generate an infinite precision subtraction result, and a round of the infinite precision addition result.

11. The apparatus of example 1, wherein the opcode is to indicate the fused multiply accumulation operation is per data element multiplication of the BF16 value from the first source operand to the BF16 value in the third source operand to generate an infinite precision intermediate result, a subtraction of the BF16 value in the second source operand to generate an infinite precision subtraction result, and a round of the infinite precision addition result.

12. The apparatus of example 1, wherein the opcode is to indicate the fused multiply accumulation operation is per data element multiplication of the BF16 value from the second source operand to the BF16 value in the first source operand to generate an infinite precision intermediate result, a subtraction of the BF16 value in the third source operand to generate an infinite precision subtraction result, and a round of the infinite precision addition result.

13. The apparatus of example 1, wherein the opcode is to indicate the fused multiply accumulation operation is per data element multiplication of the BF16 value from the second source to the BF16 value in the third source operand to generate an infinite precision intermediate result, a subtraction of the BF16 value in the first source operand to generate an infinite precision subtraction result, and a round of the infinite precision addition result.

14. The apparatus of any examples 1-13, wherein the identified first and second source operands are registers.

15. The apparatus of any of examples 1-14, further comprising:
memory to store the single instruction.

16. A method comprising:
decoding a single instruction, the single instruction to include fields for an opcode, an identification of location of a packed data source/destination operand (a first source), an identification of a location of a second packed data source operand, an identification of a location of a third packed data source operand, and an identification of location of a packed data source/destination operand, wherein the opcode is to indicate operand ordering and that execution circuitry is to, per data element position, perform a BF16 value fused multiply-accumulate operation using the first, second, and third source operands and store a result in a corresponding data element position of the source/destination operand; and
executing the decoded single instruction according to the opcode.

17. The method of example 16, wherein the opcode is to indicate the fused multiply accumulation operation is per data element position multiplication of the BF16 value from the first source operand with the BF16 value in the third source operand to generate an infinite precision intermediate result, an addition of the infinite precision intermediate result negated to the BF16 values in the second source operand to generate an infinite precision addition result, and a round of the infinite precision addition result.

18. The method of example 16, wherein the opcode is to indicate the fused multiply accumulation operation is per data element multiplication of the BF16 value from the second source operand with the BF16 value in the first source operand to generate an infinite precision intermediate result, an addition of the infinite precision intermediate result negated to the BF16 value in the third source operand to generate an infinite precision addition result, and a round of the infinite precision addition result.

19. The method of example 16, wherein the opcode is to indicate the fused multiply accumulation operation is per data element multiplication of the BF16 value from the second source to the BF16 value in the third source operand to generate an infinite precision intermediate result, an addition of the infinite precision intermediate result negated to the BF16 value in the first source operand to generate an infinite precision addition result, and a round of the infinite precision addition result.

20. The method of example 16, wherein the opcode is to indicate the fused multiply accumulation operation is per data element multiplication of the BF16 value from the first source operand to the BF16 value in the third source operand to generate an infinite precision intermediate result, an addition of a the BF16 value in the second source operand to generate an infinite precision addition result, and a round of the infinite precision addition result.

21. The method of example 16, wherein the opcode is to indicate the fused multiply accumulation operation is per data element multiplication of the BF16 value from the first source operand to the BF16 value in the second source operand to generate an infinite precision intermediate result, an addition of a the BF16 value in the third source operand to generate an infinite precision addition result, and a round of the infinite precision addition result.

22. The method of example 16, wherein the opcode is to indicate the fused multiply accumulation operation is per data element multiplication of the BF16 value from the second source to the BF16 value in the third source operand to generate an infinite precision intermediate result, an addition the BF16 value in the first source operand to generate an infinite precision addition result, and a round of the infinite precision addition result.

23. The method of example 16, wherein the opcode is to indicate the fused multiply accumulation operation is per data element multiplication of the BF16 value from the first source operand to the BF16 value in the third source operand to generate an infinite precision intermediate result, a subtraction of the infinite precision intermediate result negated to the BF16 value in the second source operand to generate an infinite precision subtraction result, and a round of the infinite precision addition result.

24. The method of example 16, wherein the opcode is to indicate the fused multiply accumulation operation is per data element multiplication of the BF16 value from the second source operand to the BF16 value in the first source operand to generate an infinite precision intermediate result, a subtraction of the infinite precision intermediate result negated to the BF16 value in the third source operand to generate an infinite precision subtraction result, and a round of the infinite precision addition result.

25. The method of example 16, wherein the opcode is to indicate the fused multiply accumulation operation is per data element multiplication of the BF16 value from the second source to the BF16 value in the third source operand to generate an infinite precision intermediate result, a subtraction of the infinite precision intermediate result negated to the BF16 value in the first source operand to generate an infinite precision subtraction result, and a round of the infinite precision addition result.

26. The method of example 16, wherein the opcode is to indicate the fused multiply accumulation operation is per data element multiplication of the BF16 value from the first source operand to the BF16 value in the third source operand to generate an infinite precision intermediate result, a subtraction of the BF16 value in the second source operand to generate an infinite precision subtraction result, and a round of the infinite precision addition result.

27. The method of example 16, wherein the opcode is to indicate the fused multiply accumulation operation is per data element multiplication of the BF16 value from the second source operand to the BF16 value in the first source operand to generate an infinite precision intermediate result, a subtraction of the BF16 value in the third source operand to generate an infinite precision subtraction result, and a round of the infinite precision addition result.

28. The method of example 16, wherein the opcode is to indicate the fused multiply accumulation operation is per data element multiplication of the BF16 value from the second source to the BF16 value in the third source operand to generate an infinite precision intermediate result, a subtraction of the BF16 value in the first source operand to generate an infinite precision subtraction result, and a round of the infinite precision addition result.

29. The method of any of examples 16-28, wherein the identified first and second source operands are registers.

30. The method of any of examples 16-29, further comprising:
   translating the single instruction to at least one instruction of a different instruction set architecture, wherein executing the decoded single instruction according to the opcode comprises executing the at least one instruction of the different instruction set architecture.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. An apparatus comprising:
   decoder circuitry to decode a single instruction, the single instruction to include fields for an opcode, an identification of location of a packed data source/destination operand (a first source), an identification of a location of a second packed data source operand, an identification of a location of a third packed data source operand, and an identification of location of a packed data source/destination operand, wherein the opcode is to indicate operand ordering and that execution circuitry is to, per data element position, perform a BF16 value fused multiply-accumulate operation using the first, second, and third source operands and store a result in a corresponding data element position of the source/destination operand; and
   execution circuitry to execute the decoded single instruction according to the opcode.

2. The apparatus of claim 1, wherein the opcode is to indicate the fused multiply accumulation operation is per data element position multiplication of the BF16 value from the first source operand with the BF16 value in the third source operand to generate an infinite precision intermediate result, an addition of the infinite precision intermediate result negated to the BF16 values in the second source operand to generate an infinite precision addition result, and a round of the infinite precision addition result.

3. The apparatus of claim 1, wherein the opcode is to indicate the fused multiply accumulation operation is per data element multiplication of the BF16 value from the second source operand with the BF16 value in the first source operand to generate an infinite precision intermediate result, an addition of the infinite precision intermediate result negated to the BF16 value in the third source operand to generate an infinite precision addition result, and a round of the infinite precision addition result.

4. The apparatus of claim 1, wherein the opcode is to indicate the fused multiply accumulation operation is per data element multiplication of the BF16 value from the second source to the BF16 value in the third source operand to generate an infinite precision intermediate result, an addition of the infinite precision intermediate result negated to the BF16 value in the first source operand to generate an infinite precision addition result, and a round of the infinite precision addition result.

5. The apparatus of claim 1, wherein the opcode is to indicate the fused multiply accumulation operation is per data element multiplication of the BF16 value from the second source operand to the BF16 value in the first source operand to generate an infinite precision intermediate result, an addition of a the BF16 value in the third source operand to generate an infinite precision addition result, and a round of the infinite precision addition result.

6. The apparatus of claim 1, wherein the opcode is to indicate the fused multiply accumulation operation is per data element multiplication of the BF16 value from the first source operand to the BF16 value in the third source operand to generate an infinite precision intermediate result, an addition of a the BF16 value in the second source operand to generate an infinite precision addition result, and a round of the infinite precision addition result.

7. The apparatus of claim 1, wherein the opcode is to indicate the fused multiply accumulation operation is per data element multiplication of the BF16 value from the second source to the BF16 value in the third source operand to generate an infinite precision intermediate result, an addition the BF16 value in the first source operand to generate an infinite precision addition result, and a round of the infinite precision addition result.

8. The apparatus of claim 1, wherein the opcode is to indicate the fused multiply accumulation operation is per data element multiplication of the BF16 value from the first source operand to the BF16 value in the third source operand to generate an infinite precision intermediate result, a subtraction of the infinite precision intermediate result negated to the BF16 value in the second source operand to generate an infinite precision subtraction result, and a round of the infinite precision addition result.

9. The apparatus of claim 1, wherein the opcode is to indicate the fused multiply accumulation operation is per data element multiplication of the BF16 value from the second source operand to the BF16 value in the first source operand to generate an infinite precision intermediate result, a subtraction of the infinite precision intermediate result negated to the BF16 value in the third source operand to generate an infinite precision subtraction result, and a round of the infinite precision addition result.

10. The apparatus of claim 1, wherein the opcode is to indicate the fused multiply accumulation operation is per data element multiplication of the BF16 value from the second source to the BF16 value in the third source operand to generate an infinite precision intermediate result, a subtraction of the infinite precision intermediate result negated to the BF16 value in the first source operand to generate an infinite precision subtraction result, and a round of the infinite precision addition result.

11. The apparatus of claim 1, wherein the opcode is to indicate the fused multiply accumulation operation is per data element multiplication of the BF16 value from the first source operand to the BF16 value in the third source operand to generate an infinite precision intermediate result, a subtraction of the BF16 value in the second source operand to generate an infinite precision subtraction result, and a round of the infinite precision addition result.

12. The apparatus of claim 1, wherein the opcode is to indicate the fused multiply accumulation operation is per data element multiplication of the BF16 value from the second source operand to the BF16 value in the first source operand to generate an infinite precision intermediate result, a subtraction of the BF16 value in the third source operand to generate an infinite precision subtraction result, and a round of the infinite precision addition result.

13. The apparatus of claim 1, wherein the opcode is to indicate the fused multiply accumulation operation is per data element multiplication of the BF16 value from the second source to the BF16 value in the third source operand to generate an infinite precision intermediate result, a subtraction of the BF16 value in the first source operand to generate an infinite precision subtraction result, and a round of the infinite precision addition result.

14. The apparatus of claim 1, wherein the identified first and second source operands are registers.

15. The apparatus of claim 1, further comprising: memory to store the single instruction.

16. A method comprising:
decoding a single instruction, the single instruction to include fields for an opcode, an identification of location of a packed data source/destination operand (a first source), an identification of a location of a second packed data source operand, an identification of a location of a third packed data source operand, and an identification of location of a packed data source/destination operand, wherein the opcode is to indicate operand ordering and that execution circuitry is to, per data element position, perform a BF16 value fused multiply-accumulate operation using the first, second, and third source operands and store a result in a corresponding data element position of the source/destination operand; and
executing the decoded single instruction according to the opcode.

17. The method of claim 16, wherein the opcode is to indicate the fused multiply accumulation operation is per data element position multiplication of the BF16 value from the first source operand with the BF16 value in the third source operand to generate an infinite precision intermediate result, an addition of the infinite precision intermediate result negated to the BF16 values in the second source operand to generate an infinite precision addition result, and a round of the infinite precision addition result.

18. The method of claim 16, wherein the opcode is to indicate the fused multiply accumulation operation is per data element multiplication of the BF16 value from the second source operand with the BF16 value in the first source operand to generate an infinite precision intermediate result, an addition of the infinite precision intermediate result negated to the BF16 value in the third source operand to generate an infinite precision addition result, and a round of the infinite precision addition result.

19. The method of claim 16, wherein the opcode is to indicate the fused multiply accumulation operation is per data element multiplication of the BF16 value from the second source to the BF16 value in the third source operand to generate an infinite precision intermediate result, an addition of the infinite precision intermediate result negated to the BF16 value in the first source operand to generate an infinite precision addition result, and a round of the infinite precision addition result.

20. The method of claim 16, wherein the opcode is to indicate the fused multiply accumulation operation is per data element multiplication of the BF16 value from the first source operand to the BF16 value in the third source operand to generate an infinite precision intermediate result, an addition of a the BF16 value in the second source operand to generate an infinite precision addition result, and a round of the infinite precision addition result.

21. The method of claim 16, wherein the opcode is to indicate the fused multiply accumulation operation is per data element multiplication of the BF16 value from the first source operand to the BF16 value in the second source operand to generate an infinite precision intermediate result, an addition of a the BF16 value in the third source operand to generate an infinite precision addition result, and a round of the infinite precision addition result.

22. The method of claim 16, wherein the opcode is to indicate the fused multiply accumulation operation is per data element multiplication of the BF16 value from the second source to the BF16 value in the third source operand to generate an infinite precision intermediate result, an addition the BF16 value in the first source operand to generate an infinite precision addition result, and a round of the infinite precision addition result.

23. The method of claim 16, wherein the opcode is to indicate the fused multiply accumulation operation is per data element multiplication of the BF16 value from the first source operand to the BF16 value in the third source operand to generate an infinite precision intermediate result, a subtraction of the infinite precision intermediate result negated to the BF16 value in the second source operand to generate an infinite precision subtraction result, and a round of the infinite precision addition result.

24. The method of claim 16, wherein the opcode is to indicate the fused multiply accumulation operation is per data element multiplication of the BF16 value from the second source operand to the BF16 value in the first source operand to generate an infinite precision intermediate result, a subtraction of the infinite precision intermediate result negated to the BF16 value in the third source operand to generate an infinite precision subtraction result, and a round of the infinite precision addition result.

25. The method of claim 16, wherein the opcode is to indicate the fused multiply accumulation operation is per data element multiplication of the BF16 value from the second source to the BF16 value in the third source operand to generate an infinite precision intermediate result, a subtraction of the infinite precision intermediate result negated to the BF16 value in the first source operand to generate an infinite precision subtraction result, and a round of the infinite precision addition result.

26. The method of claim 16, wherein the opcode is to indicate the fused multiply accumulation operation is per data element multiplication of the BF16 value from the first source operand to the BF16 value in the third source operand to generate an infinite precision intermediate result, a subtraction of the BF16 value in the second source operand to generate an infinite precision subtraction result, and a round of the infinite precision addition result.

27. The method of claim 16, wherein the opcode is to indicate the fused multiply accumulation operation is per data element multiplication of the BF16 value from the second source operand to the BF16 value in the first source operand to generate an infinite precision intermediate result, a subtraction of the BF16 value in the third source operand to generate an infinite precision subtraction result, and a round of the infinite precision addition result.

28. The method of claim 16, wherein the opcode is to indicate the fused multiply accumulation operation is per data element multiplication of the BF16 value from the second source to the BF16 value in the third source operand to generate an infinite precision intermediate result, a subtraction of the BF16 value in the first source operand to generate an infinite precision subtraction result, and a round of the infinite precision addition result.

29. The method of claim 16, wherein the identified first and second source operands are registers.

30. The method of claim 16, further comprising:
translating the single instruction to at least one instruction of a different instruction set architecture, wherein executing the decoded single instruction according to the opcode comprises executing the at least one instruction of the different instruction set architecture.

* * * * *